(12) United States Patent
Klasen-Memmer et al.

(10) Patent No.: US 8,025,935 B2
(45) Date of Patent: Sep. 27, 2011

(54) LIQUID-CRYSTALLINE MEDIUM

(75) Inventors: Melanie Klasen-Memmer, Heuchelheim (DE); Elisabeth Meyer, Hanau (DE); Detlef Pauluth, Ober-Ramstadt (DE); Andreas Taugerbeck, Darmstadt (DE)

(73) Assignee: Merck Patent GmbH, Darmstadt (DE)

( * ) Notice: Subject to any disclaimer, the term of this patent is extended or adjusted under 35 U.S.C. 154(b) by 618 days.

(21) Appl. No.: 12/063,336

(22) PCT Filed: Aug. 3, 2006

(86) PCT No.: PCT/EP2006/007692
§ 371 (c)(1),
(2), (4) Date: Feb. 8, 2008

(87) PCT Pub. No.: WO2007/017180
PCT Pub. Date: Feb. 15, 2007

(65) Prior Publication Data
US 2010/0134751 A1    Jun. 3, 2010

(30) Foreign Application Priority Data
Aug. 9, 2005 (DE) .......................... 10 2005 048 064

(51) Int. Cl.
*C09K 19/30* (2006.01)
*C09K 19/32* (2006.01)
*C09K 19/34* (2006.01)
*C09K 19/12* (2006.01)
*C09K 19/20* (2006.01)

(52) U.S. Cl. ............... 428/1.1; 252/299.61; 252/299.62; 252/299.63; 252/299.66; 252/299.67

(58) Field of Classification Search .................... 428/1.1; 252/299.61, 299.63, 299.66, 299.67, 299.62
See application file for complete search history.

(56) References Cited

U.S. PATENT DOCUMENTS

| 6,126,857 A | 10/2000 | Reiffenrath et al. |
| 6,497,828 B1 | 12/2002 | Hirschmann et al. |
| 6,933,022 B2 * | 8/2005 | Klasen-Memmer et al. .. 428/1.1 |
| 7,026,022 B2 * | 4/2006 | Klasen-Memmer et al. .. 428/1.1 |
| 7,122,228 B2 * | 10/2006 | Reiffenrath et al. ........... 428/1.1 |
| 7,371,437 B2 * | 5/2008 | Klasen-Memmer et al. .. 428/1.1 |
| 7,582,337 B2 * | 9/2009 | Klasen-Memmer et al. .. 428/1.1 |
| 7,785,677 B2 * | 8/2010 | Klasen-Memmer et al. .. 428/1.1 |
| 7,854,970 B2 * | 12/2010 | Klasen-Memmer et al. .. 428/1.1 |
| 2001/0009272 A1 | 7/2001 | Tarumi et al. |
| 2003/0197153 A1 | 10/2003 | Heckmeier et al. |
| 2004/0146662 A1 | 7/2004 | Klasen-Memmer |
| 2004/0171866 A1 * | 9/2004 | Reiffenrath et al. ........... 560/86 |

FOREIGN PATENT DOCUMENTS

| DE | 100 58 664 A1 | 6/2001 |
| DE | 102 18 976 A1 | 12/2002 |
| EP | 0 834 491 A1 | 4/1998 |
| EP | 1 302 523 A | 4/2003 |
| GB | 2 327 682 A | 2/1999 |
| WO | WO 98/13321 A | 4/1998 |
| WO | WO 2006/002747 A | 1/2006 |
| WO | WO 2006/002952 A | 1/2006 |

* cited by examiner

*Primary Examiner* — Shean Wu
(74) *Attorney, Agent, or Firm* — Millen, White, Zelano & Branigan, P.C.

(57) ABSTRACT

The invention relates to a liquid-crystalline medium having negative dielectric anisotropy based on a mixture of polar compounds, which comprises at least one compound of the formula I

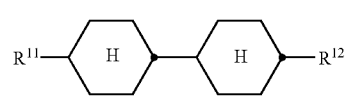

I in which
$R^{11}$ and $R^{12}$ have the meanings indicated in claim 1,
in amounts of $\geq 30\%$ by weight, based on the medium,
and to the use thereof for an active-matrix display based on the ECB, PALC, FFS or IPS effect.

21 Claims, No Drawings

LIQUID-CRYSTALLINE MEDIUM

The invention relates to a liquid-crystalline medium having negative dielectric anisotropy based on a mixture of polar compounds, which comprises at least one compound of the formula I

                                                        I in which $R^{11}$ denotes an alkyl or alkenyl radical having up to 4 C atoms which is unsubstituted, monosubstituted by CN or $CF_3$ or at least monosubstituted by halogen, where, in addition, one or more $CH_2$ groups in these radicals may be replaced by —O—, —S—,

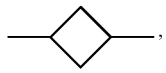

—C≡C—, —$CF_2$O—, —O$CF_2$—, —OC—O— or —O—CO— in such a way that O atoms are not linked directly to one another, $R^{12}$ denotes an alkenyl radical having up to 5 C atoms which is unsubstituted, monosubstituted by CN or $CF_3$ or at least monosubstituted by halogen, where, in addition, one or more $CH_2$ groups in these radicals may be replaced by —O—, —S—,

—C≡C—, —$CF_2$O—, —O$CF_2$—, —OC—O— or —O—CO— in such a way that O atoms are not linked directly to one another,
in amounts of ≧30% by weight, based on the medium.

Media of this type are to be used, in particular, for electro-optical displays with active-matrix addressing based on the ECB effect and for IPS (in-plane switching) displays. The medium according to the invention preferably has negative dielectric anisotropy.

The principle of electrically controlled birefringence, the ECB (electrically controlled birefringence) effect or DAP (deformation of aligned phases) effect, was described for the first time in 1971 (M. F. Schieckel and K. Fahrenschon, "Deformation of nematic liquid crystals with vertical orientation in electrical fields", Appl. Phys. Lett. 19 (1971), 3912). Papers by J. F. Kahn (Appl. Phys. Lett. 20 (1972), 1193) and G. Labrunie and J. Robert (J. Appl. Phys. 44 (1973), 4869) followed.

The papers by J. Robert and F. Clerc (SID 80 Digest Techn. Papers (1980), 30), J. Duchene (Displays 7 (1986), 3) and H. Schad (SID 82 Digest Techn. Papers (1982), 244) have shown that liquid-crystalline phases must have high values for the ratio between the elastic constants $K_3/K_1$, high values for the optical anisotropy $\Delta n$ and values for the dielectric anisotropy $\Delta\varepsilon$ of $\leq -0.5$ in order to be suitable for use for high-information display elements based on the ECB effect. Electro-optical display elements based on the ECB effect have a homeotropic edge alignment (VA technology=vertically aligned). Dielectrically negative liquid-crystal media can also be used in displays which use the so-called IPS effect.

Displays which use the ECB effect have become established as so-called VAN (vertically aligned nematic) displays in the MVA (multi-domain vertical alignment, for example: Yoshide, H. et al., Paper 3.1: "MVA LCD for Notebook or Mobile PCs...", SID 2004 International Symposium, Digest of Technical Papers, XXXV, Book I, pp. 6 to 9 and Liu, C. T. et al., Paper 15.1: "A 46-inch TFT-LCD HDTV Technology...", SID 2004 International Symposium, Digest of Technical Papers, XXXV, Book II, pp. 750 to 753) and PVA (patterned vertical alignment, for example: Kim, Sang Soo, Paper 15.4: "Super PVA Sets New State-of-the-Art for LCD-TV", SID 2004 International Symposium, Digest of Technical Papers, XXXV, Book II, pp. 760 to 763) designs besides ASV (advanced super view, for example: Shigeta, Mitzuhiro and Fukuoka, Hirofumi, Paper 15.2: "Development of High Quality LCDTV", SID 2004 International Symposium, Digest of Technical Papers, XXXV, Book II, pp. 754 to 757) displays and IPS (in plane switching) displays (for example: Yeo, S. D., Paper 15.3: "A LC Display for the TV Application", SID 2004 International Symposium, Digest of Technical Papers, XXXV, Book II, pp. 758 & 759), besides the long-known displays, as one of the three more recent types of liquid-crystal display that are currently the most important besides TN (twisted nematic) displays, in particular for television applications. In general form, the technologies are compared, for example, in Souk, Jun, SID Seminar 2004, Seminar M-6: "Recent Advances in LCD Technology", Seminar Lecture Notes, M-6/1 to M-6/26 and Miller, Ian, SID Seminar 2004, Seminar M-7: "LCD-Television", Seminar Lecture Notes, M-7/1 to M-7/32. Although the response times of modern ECB displays have already been significantly improved by addressing methods with overdrive, for example: Kim, Hyeon Kyeong et al., paper 9.1: "A 57-in. Wide UXGA TFT-LCD for HDTV Application", SID 2004 International Symposium, Digest of Technical Papers, XXXV, Book I, pp. 106 to 109, the achievement of video-compatible response times, in particular for the switching of grey shades, is still a problem which has not yet been solved to a satisfactory extent.

Industrial application of this effect in electro-optical display elements requires LC phases which have to comply with a multiplicity of requirements. Particularly important here are chemical resistance to moisture, air and physical influences, such as heat, radiation in the infrared, visible and ultraviolet regions, and direct and alternating electric fields.

Furthermore, LC phases which can be used industrially are required to have a liquid-crystalline mesophase in a suitable temperature range and low viscosity.

None of the series of compounds having a liquid-crystalline mesophase that have been disclosed hitherto includes a single compound which meets all these requirements. Mixtures of two to 25, preferably three to 18, compounds are therefore generally prepared in order to obtain substances which can be used as LC phases. However, it has not been possible to prepare optimum phases easily in this manner, since no liquid-crystal materials having significantly negative dielectric anisotropy and adequate long-term stability have hitherto been available.

Matrix liquid-crystal displays (MLC displays) are known. Non-linear elements which can be used for individual switching of the individual pixels are, for example, active elements (i.e. transistors). The term "active matrix" is then used, where a distinction can be made between two types:

1. MOS (metal oxide semiconductor) transistors on a silicon wafer as substrate.
2. Thin-film transistors (TFTs) on a glass plate as substrate.

In the case of type 1, the electro-optical effect used is usually dynamic scattering or the guest-host effect. The use of single-crystal silicon as substrate material restricts the display size, since even modular assembly of various part-displays results in problems at the joints.

In the case of the more promising type 2, which is preferred, the electro-optical effect used is usually the TN effect.

A distinction is made between two technologies: TFTs comprising compound semiconductors, such as, for example, CdSe, or TFTs based on polycrystalline or amorphous silicon. The latter technology is being worked on intensively worldwide.

The TFT matrix is applied to the inside of one glass plate of the display, while the other glass plate carries the transparent counterelectrode on its inside. Compared with the size of the pixel electrode, the TFT is very small and has virtually no adverse effect on the image. This technology can also be extended to fully colour-capable displays, in which a mosaic of red, green and blue filters is arranged in such a way that a filter element is opposite each switchable pixel.

The TFT displays disclosed hitherto usually operate as TN cells with crossed polarisers in transmission and are back-lit.

The term MLC displays here covers any matrix display with integrated non-linear elements, i.e. besides the active matrix, also displays with passive elements, such as varistors or diodes (MIM=metal-insulator-metal).

MLC displays of this type are particularly suitable for TV applications (for example pocket TVs) or for high-information displays in automobile or aircraft construction. Besides problems regarding the angle dependence of the contrast and the response times, difficulties also arise in MLC displays due to insufficiently high specific resistance of the liquid-crystal mixtures [TOGASHI, S., SEKIGUCHI, K., TANABE, H., YAMAMOTO, E., SORIMACHI, K., TAJIMA, E., WATANABE, H., SHIMIZU, H., Proc. Eurodisplay 84, September 1984: A 210-288 Matrix LCD Controlled by Double Stage Diode Rings, pp. 141 ff., Paris; STROMER, M., Proc. Eurodisplay 84, September 1984: Design of Thin Film Transistors for Matrix Addressing of Television Liquid Crystal Displays, pp. 145 ff., Paris]. With decreasing resistance, the contrast of an MLC display deteriorates. Since the specific resistance of the liquid-crystal mixture generally drops over the life of an MLC display owing to interaction with the inside surfaces of the display, a high (initial) resistance is very important for displays that have to have acceptable resistance values over a long operating period.

The disadvantages of the MLC-TN displays disclosed hitherto are their comparatively low contrast, the relatively high viewing-angle dependence and the difficulty of producing grey shades in these displays.

There thus continues to be a great demand for MLC displays having very high specific resistance at the same time as a wide operating-temperature range, short response times and low threshold voltage with the aid of which various grey shades can be produced.

The invention has the object of providing MLC displays, in particular for monitor and TV applications, which are based on the ECB or IPS effect, do not have the disadvantages indicated above, or only do so to a lesser extent, and at the same time have very high specific resistance values. In particular, it must be ensured for monitors and televisions that they also work at extremely high and extremely low temperatures.

Surprisingly, it has now been found that this object can be achieved if nematic liquid-crystal mixtures which comprise at least one compound of the formula I in high concentrations are used in these display elements. Compounds of the formula I are known, for example, from EP 0 168 683 B1 and EP 0 122 389 B1.

The invention thus relates to a liquid-crystalline medium based on a mixture of polar compounds which comprises at least one compound of the formula I in amounts of ≧30% by weight.

The mixtures according to the invention exhibit very broad nematic phase ranges with clearing points ≧70° C., very favourable values for the capacitive threshold, relatively high values for the holding ratio and at the same time very good low-temperature stabilities at −30° C. and −40° C. as well as very low rotational viscosities and short response times. The mixtures according to the invention, in particular those which comprise ≧30% by weight of

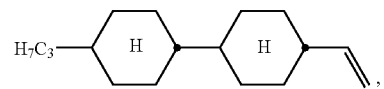

are distinguished by the fact that, in addition to the improvement in the rotational viscosity $\gamma_1$, an increase in the elastic constant $K_{33}$ contributes to the improvement in the response times.

Some preferred embodiments of the mixtures according to the invention are shown below:

a) $R^{11}$ in formula I preferably denotes alkyl or alkenyl, in particular ethyl, propyl, butyl, vinyl, 1 E-alkenyl or 3E-alkenyl.

$R^{12}$ in formula I preferably denotes vinyl, 1 E-alkenyl or 3-alkenyl, preferably $CH_2=CH$.

b) Liquid-crystalline medium which comprises one, two, three, four or more, preferably one, two or three, compounds of the formula I, c) Liquid-crystalline medium in which the proportion of compounds of the formula I in the mixture as a whole is at least 30% by weight, preferably at least 35% by weight, particularly preferably ≧38% by weight.

d) Liquid-crystalline medium which additionally comprises a compound of the formula

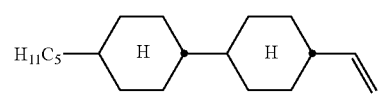

preferably in amounts of ≦25% by weight.

e) Liquid-crystalline medium which additionally comprises one or more compounds of the formulae IIA and/or IIB

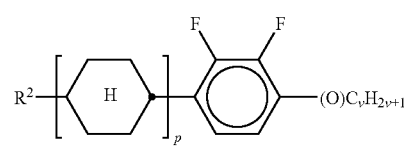

IIA

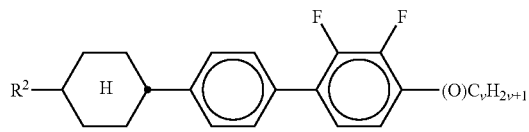
IIB in which
R² denotes H, an alkyl or alkenyl radical having up to 15 C atoms which is unsubstituted, monosubstituted by CN or CF₃ or at least monosubstituted by halogen, where, in addition, one or more CH₂ groups in these radicals may be replaced by —O—, —S—,

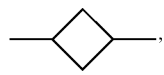

—C≡C—, —CF₂O—, —OCF₂—, —OC—O— or —O—CO— in such a way that O atoms are not linked directly to one another,
p denotes 1 or 2, and
v denotes 1 to 6.
f) Liquid-crystalline medium which additionally comprises one or more compounds of the formula III

III

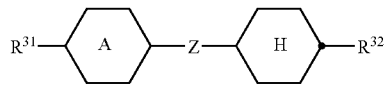

in which
R³¹ and R³² each, independently of one another, denote a straight-chain alkyl, alkoxyalkyl or alkoxy radical having up to 12 C atoms, and

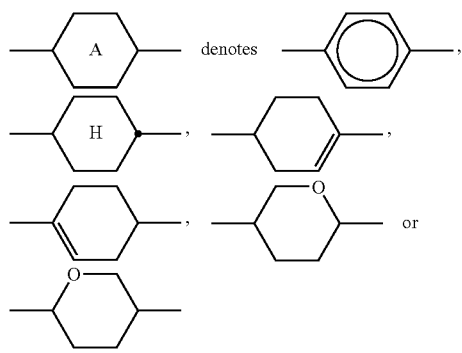

Z denotes a single bond, —CH₂CH₂—, —CH=CH—, —CF₂O—, —OCF₂—, —CH₂O—, —OCH₂—, —COO—, —OCO—, —C₂F₄— or —CF=CF—.
g) Liquid-crystalline medium in which the proportion of compounds of the formulae IIA and/or IIB in the mixture as a whole is at least 20% by weight.
h) Liquid-crystalline medium in which the proportion of the compounds of the formula III in the mixture as a whole is at least 5% by weight.
i) Liquid-crystalline medium which comprises at least one compound selected from the sub-formulae I1 to I9:

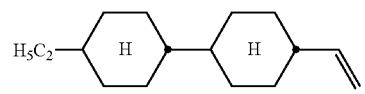
I1

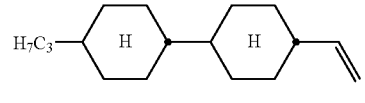
I2

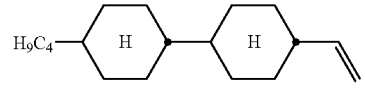
I3

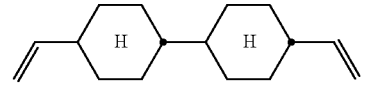
I4

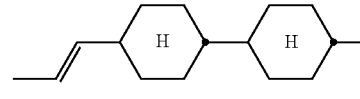
I5

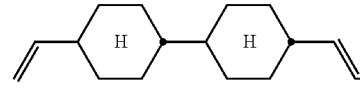
I6

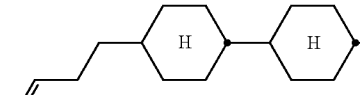
I7

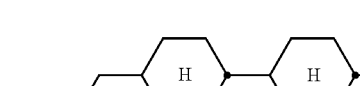
I8

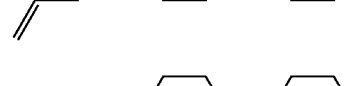
I9

Particularly preferred media according to the invention comprise a compound of the formula

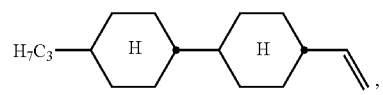

preferably in amounts of 30-60% by weight, in particular 35-60-% by weight, and/or a compound of the formula

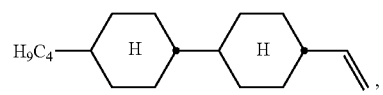

preferably in amounts of 30-40% by weight, in particular 35-40% by weight. If the mixture according to the invention comprises both a compound of the formula

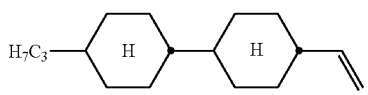

and a compound of the formula

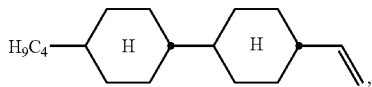

the total concentration of these two compounds in the mixture is ≧40% by weight, preferably ≧45% by weight, in particular ≧50% by weight.

j) Liquid-crystalline medium which comprises at least one or more compounds from the group

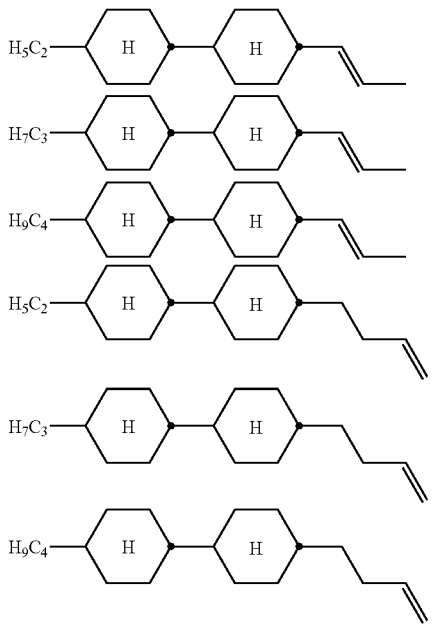

k) Liquid-crystalline medium which additionally comprises one or more compounds selected from the formulae IIIa to IIIh:

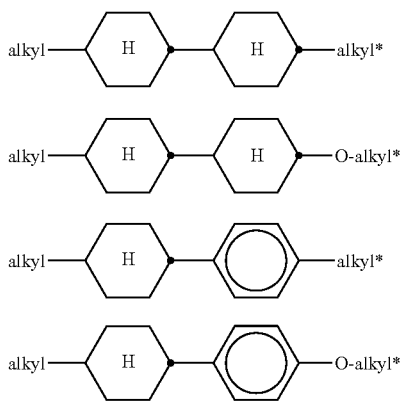

IIIa

IIIb

IIIc

IIId

-continued

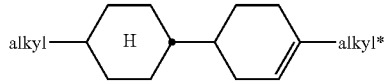

IIIe

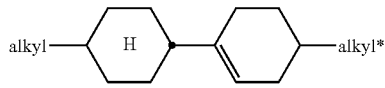

IIIf

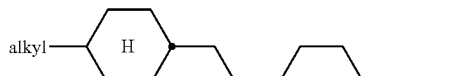

IIIg

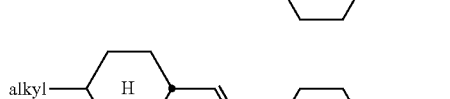

IIIh

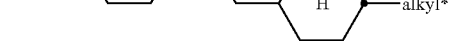

in which alkyl and alkyl* each, independently of one another, denote a straight-chain alkyl radical having 1-6 C atoms.

The medium according to the invention preferably comprises at least one compound of the formula IIIa, formula IIIb and/or formula IIId.

l) Liquid-crystalline medium which comprises or consists of 30-80% by weight of one or more compounds of the formula I and 20-70% by weight of one or more compounds of the formulae IIA and/or IIB, where the total amount of the compounds of the formulae I and IIA and/or IIB is ≦100% by weight.

m) Liquid-crystalline medium which additionally comprises one or more tetracyclic compounds of the formulae

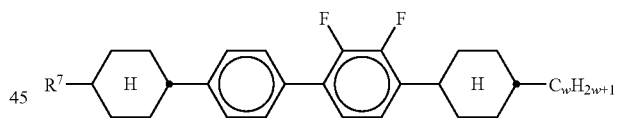

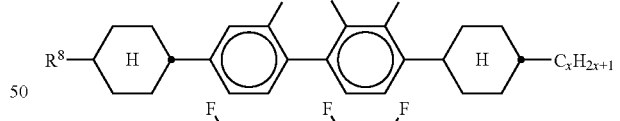

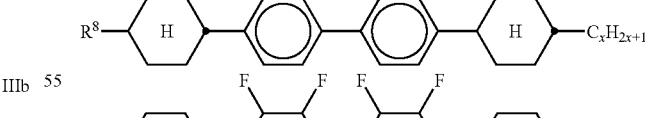

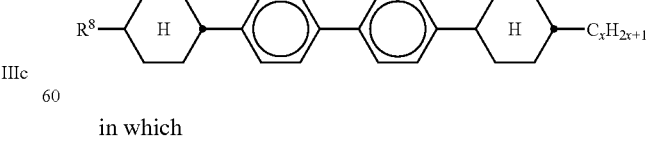

in which $R^7$ and $R^8$ each, independently of one another, have one of the meanings indicated for $R^2$ in claim 2, and w and x each, independently of one another, denote 1 to 6.

n) Liquid-crystalline medium which additionally comprises one or more compounds of the formulae Y-1 to Y-11

Y-1
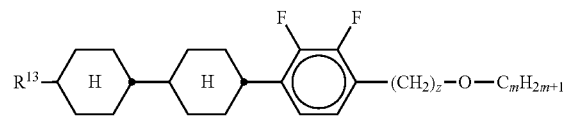

Y-2
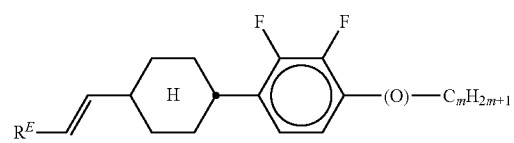

Y-3
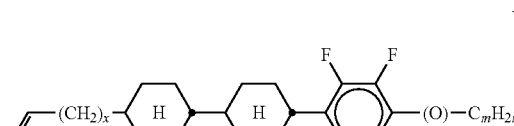

Y-4
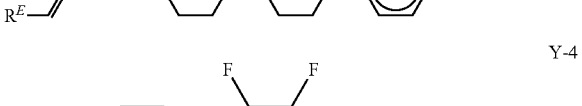

Y-5
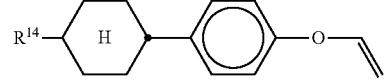

Y-6
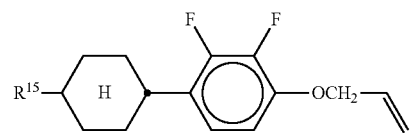

Y-7
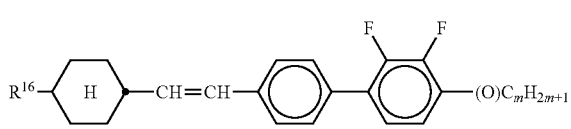

Y-8
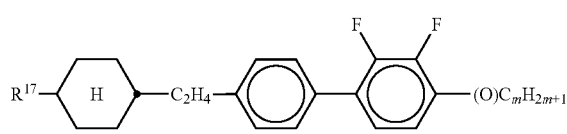

Y-9
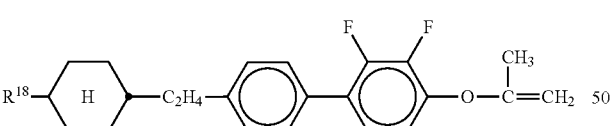

Y-10
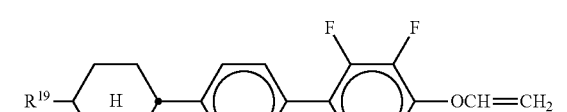

Y-11
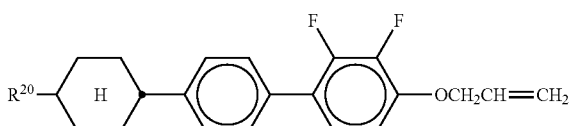

in which $R^{13}$-$R^{20}$ each, independently of one another, have the same meanings indicated for $R^2$, and z and m each, independently of one another, denote 1-6. $R^E$ denotes H, $CH_3$, $C_2H_5$ or n-$C_3H_7$.

x denotes 0, 1, 2 or 3.

The medium according to the invention particularly preferably comprises one or more compounds of the formulae Y-2, Y-3 and/or Y-11 having an alkenyl side chain, preferably in amounts of ≧5% by weight.

o) Liquid-crystalline medium which additionally comprises one or more compounds of the formula

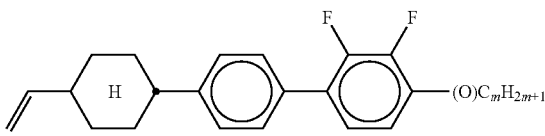

preferably in amounts of >3% by weight, in particular 5% by weight and very particularly preferably 5-25% by weight, where $R^{21}$ has the meanings indicated for $R^2$, and m denotes 1-6.

p) Liquid-crystalline medium additionally comprising one or more fluorinated terphenyls of the formulae T-1 to T-22

T-1

T-2

T-3

T-4

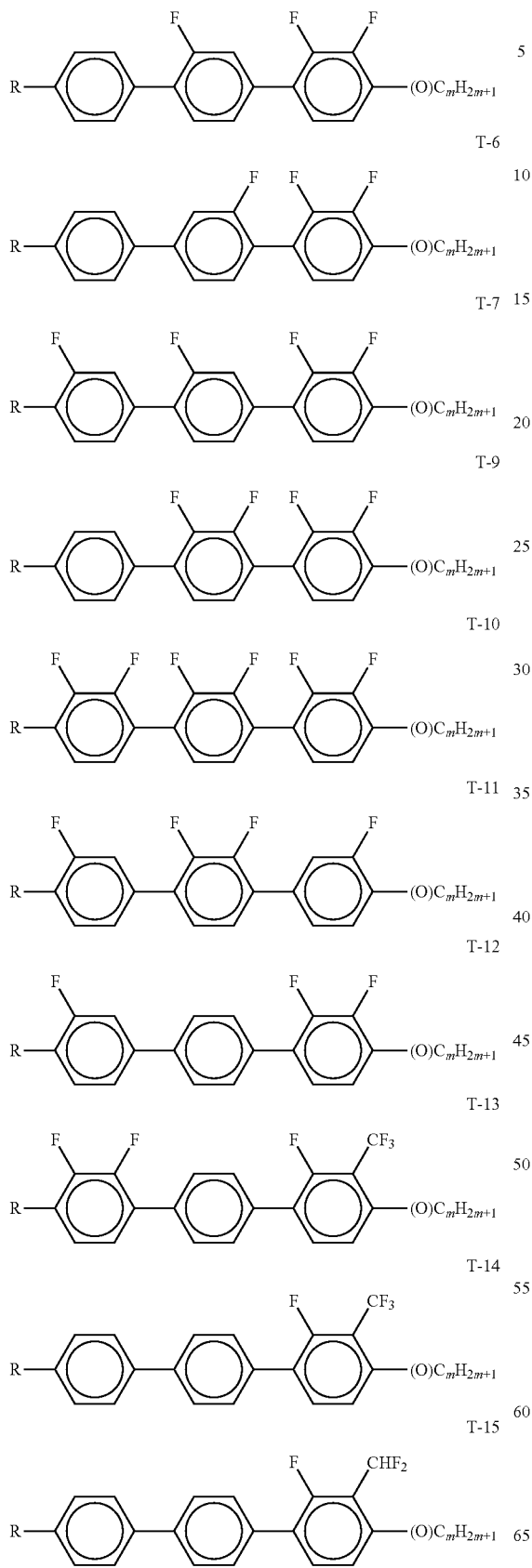

in which

R has the meanings indicated for $R^2$.

R is preferably straight-chain alkyl, alkoxy or alkoxyalkyl, in each case having 1-6 C atoms, alkenyl or alkenyloxy having 2-6 C atoms. R preferably denotes methyl, ethyl, propyl, butyl, pentyl, hexyl, methoxy, ethoxy, propoxy, butoxy or pentoxy.

The medium according to the invention preferably comprises the terphenyls of the formulae T-1 to T-22 in amounts of 2-30% by weight, in particular 5-20% by weight.

Particular preference is given to compounds of the formulae T-1, T-2, T-3 and T-22. In these compounds, R preferably denotes alkyl, furthermore alkoxy, in each case having 1-5 C atoms.

The terphenyls are preferably employed in mixtures having a $\Delta n \geqq 0.10$ in combination with the compounds of the formulae I, IIA, IIB and III. Preferred mixtures comprise 2-20% by weight of terphenyls and 5-60% by weight of the compounds of the formulae IIA and/or IIB.

q) Liquid-crystalline medium additionally comprising one or more bi-phenyls of the formulae B-1 to B-4

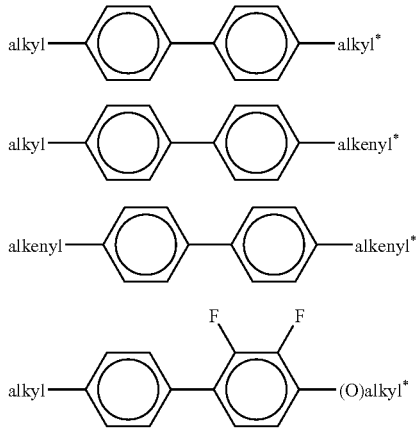

in which
alkyl and alkyl* each, independently of one another, denote a straight-chain alkyl having 1-6 C atoms, and
alkenyl and alkenyl* each, independently of one another, denote a straight-chain alkenyl radical having 2-6 C atoms.
The proportion of the biphenyls of the formulae B-1 to B-4 in the mixture as a whole is preferably at least 3% by weight, in particular 5% by weight.
Of the compounds of the formulae B-1 to B-4, the compounds of the formulae B-1 and B-4 are particularly preferred.
Particularly preferred biphenyls are

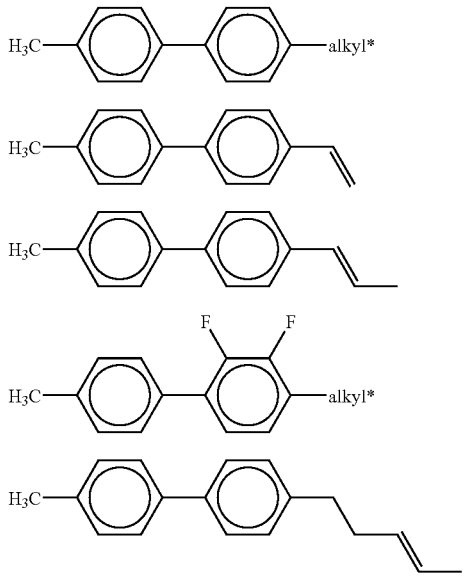

in which R denotes alkyl, alkenyl, alkoxy, alkoxyalkyl, alkenyloxy having 1 or 2 to 6 C atoms, and alkenyl has the meaning indicated above. The medium according to the invention particularly preferably comprises one or more compounds of the formulae B-1a and/or B-2c.

r) Liquid-crystalline medium which additionally comprises one or more compounds of the formulae

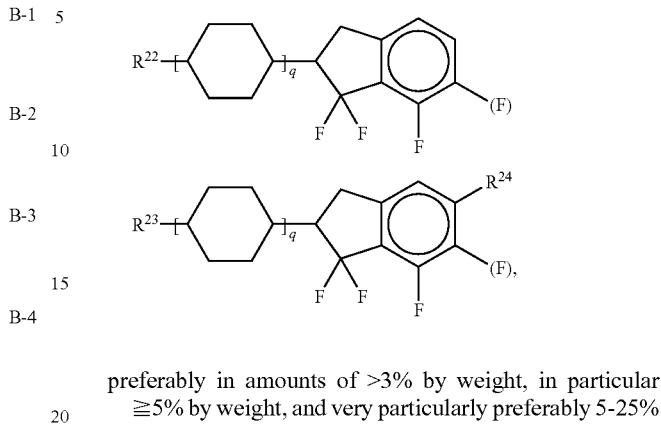

preferably in amounts of >3% by weight, in particular ≧5% by weight, and very particularly preferably 5-25% by weight,
where
$R^{22-23}$ have the meanings indicated for $R^{11}$, and $R^{24}$ denotes $CH_3$, $C_2H_5$ or n-$C_3H_7$, and q denotes 1 or 2.

s) Liquid-crystalline medium additionally comprising at least one compound of the formulae Z-1 to Z-22

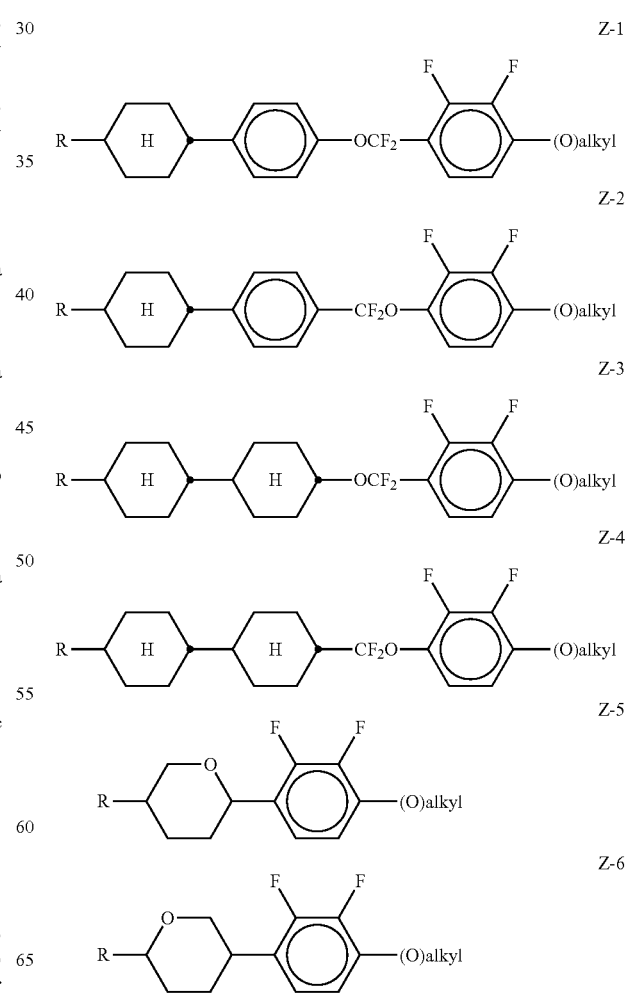

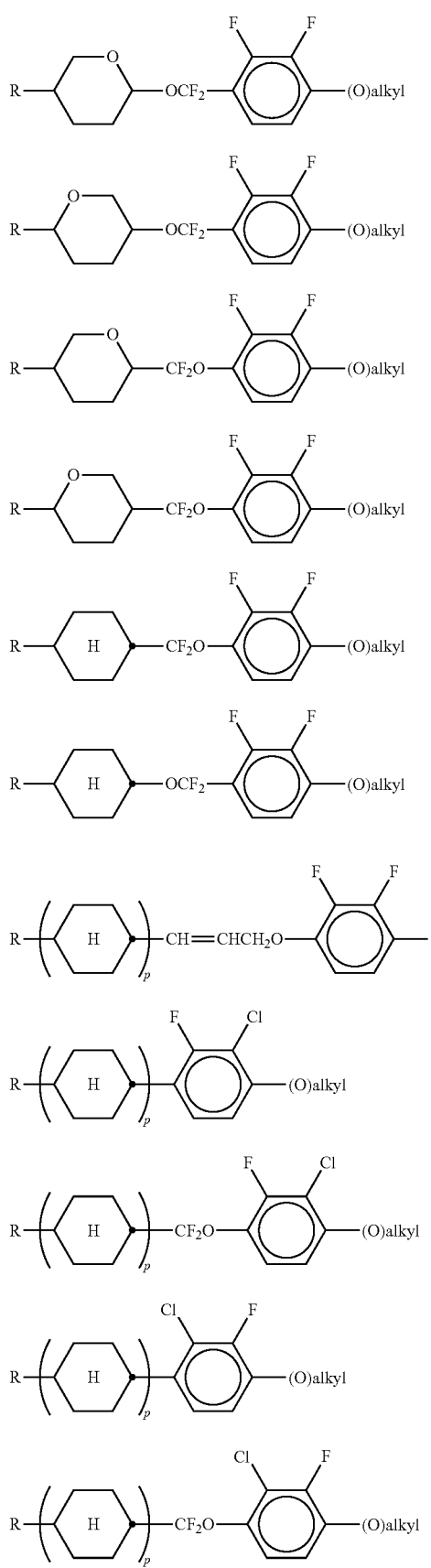

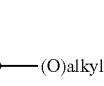

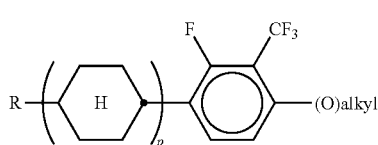

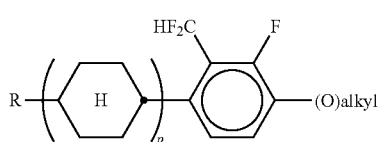

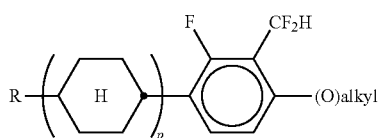

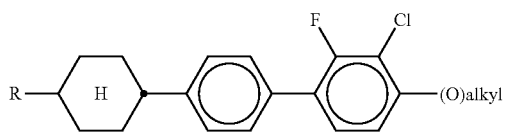

in which R and alkyl have the meanings indicated above, and p is 1 or 2, preferably in amounts of 5% by weight, in particular ≧10% by weight.

Particular preference is given to media which comprise one, two or more compounds of the formulae Z-1 to Z-9 and additionally one, two or more compounds of the formula II. Mixtures of this type preferably comprise ≧10% by weight of compounds of the formula II.

t) Liquid-crystalline medium comprising at least one compound of the formulae O-1 to O-12

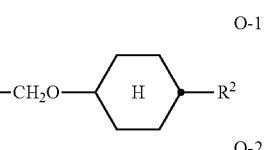

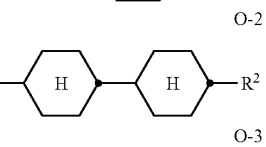

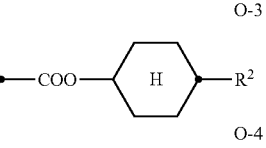

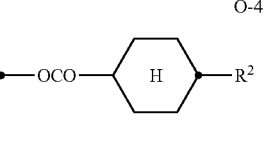

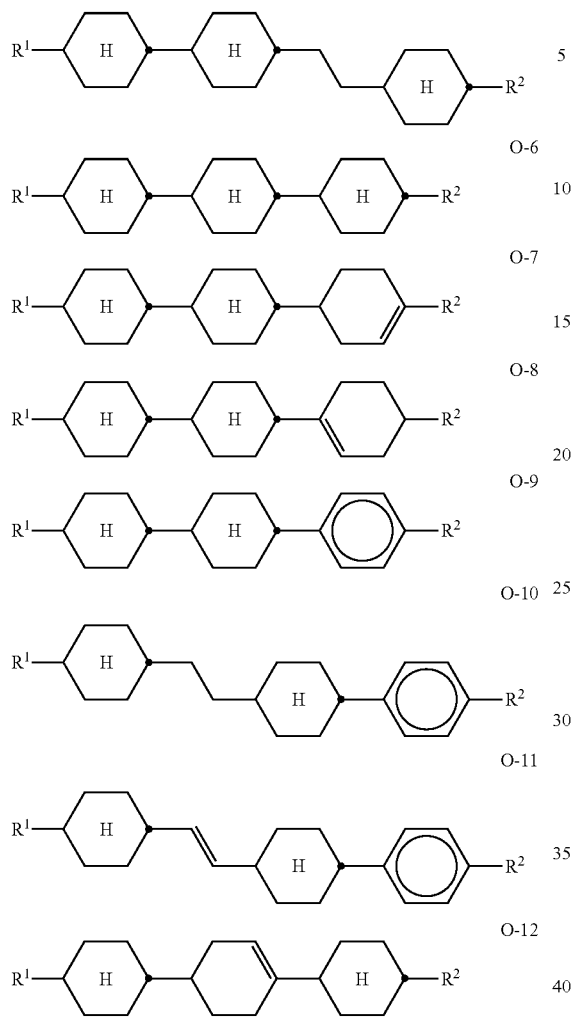

in which R$^1$ and R$^2$ have the meanings indicated for R$^2$, and R$^1$ and R$^2$ each, independently of one another, preferably denote straight-chain alkyl, furthermore alkenyl.

u) Preferred liquid-crystalline media according to the invention comprise one or more substances which contain a tetrahydronaphthyl or naphthyl unit, such as, for example, the compounds of the formulae N-1 to N-5

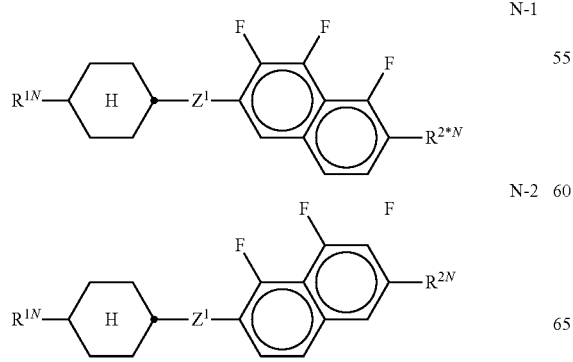

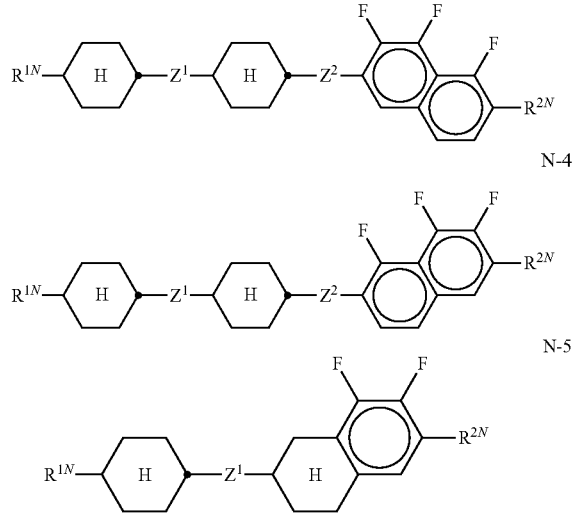

in which R$^{1N}$ and R$^{2N}$ each, independently of one another, have the meanings indicated for R$^2$, preferably denote straight-chain alkyl, straight-chain alkoxy or straight-chain alkenyl, and Z, Z$^1$ and Z$^2$ each, independently of one another, denote —C$_2$H$_4$—, —CH═CH—, —(CH$_2$)$_4$—, —(CH$_2$)$_3$O—, —O(CH$_2$)$_3$—, —CH═CHCH$_2$CH$_2$—, —CH$_2$CH$_2$CH═CH—, —CH$_2$O—, —OCH$_2$—, —COO—, —OCO—, —C$_2$F$_4$—, —CF═CF—, —CF═CH—, —CH═CF—, —CF$_2$O—, —OCF$_2$—, —CH$_2$— or a single bond.

v) Preferred mixtures comprise one or more difluorobenzochroman compounds of the formula BC

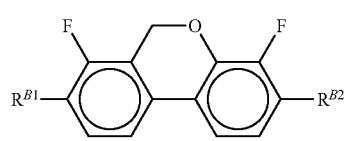

in which

R$^{B1}$ and R$^{B2}$ each, independently of one another, have the meaning of R$^2$, preferably in amounts of 3 to 20% by weight, in particular in amounts of 3 to 15% by weight.

Particularly preferred compounds of the formula BC are compounds BC-1 to BC-7

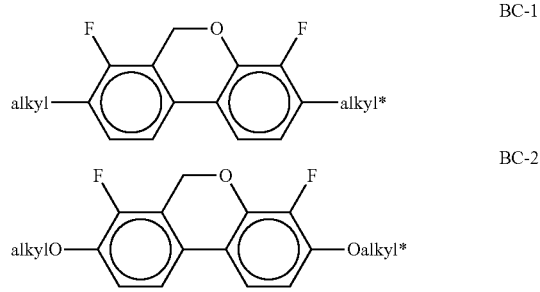

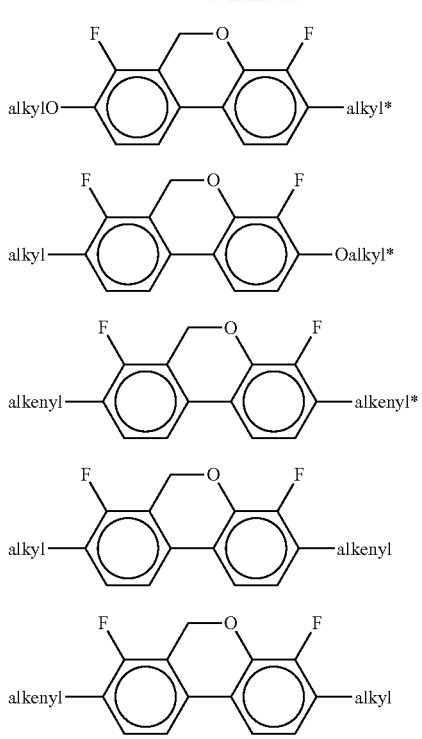

in which
alkyl and alkyl* each, independently of one another, denote a straight-chain alkyl radical having 1-6 C atoms, and
alkenyl and
alkenyl* each, independently of one another, denote a straight-chain alkenyl radical having 2-6 C atoms.

Very particularly preferred mixtures comprise one, two or three compounds of the formula BC-2.

The invention furthermore relates to an electro-optical display with active-matrix addressing based on the ECB effect, characterised in that it contains, as dielectric, a liquid-crystalline medium according to one of claims 1 to 10.

The liquid-crystalline medium according to the invention preferably has a nematic phase from ≦20° C. to ≧70° C., particularly preferably from ≦30° C. to ≧80° C., very particularly preferably from ≦40° C. to ≧90° C.

The term "have a nematic phase" here means on the one hand that no smectic phase and no crystallisation are observed at low temperatures at the corresponding temperature and on the other hand that clearing does not occur on heating from the nematic phase. The investigation at low temperatures is carried out in a flow viscometer at the corresponding temperature and is checked by storage in test cells having a layer thickness corresponding to the electro-optical application for at least 100 hours.

If the storage stability at a temperature of −20° C. in a corresponding test cell is 1000 h or more, the medium is regarded as stable at this temperature. At temperatures of −30° C. and −40° C., the corresponding times are 500 h and 250 h respectively. At high temperatures, the clearing point is measured by conventional methods in capillaries.

The liquid-crystal mixture preferably has a nematic phase range of at least 60 K and a flow viscosity $v_{20}$ of at most 30 $mm^2 \cdot s^{-1}$ at 20° C.

The liquid-crystal mixture according to the invention has a $\Delta\varepsilon$ of −0.5 to −8.0, in particular of −3.0 to −6.0, where $\Delta\varepsilon$ denotes the dielectric anisotropy. The rotational viscosity $\gamma_1$ is preferably <200 mPa·s, in particular <170 mPa·s.

The values of the birefringence $\Delta n$ in the liquid-crystal mixture are generally between 0.07 and 0.16, preferably between 0.08 and 0.12.

The liquid-crystal media according to the invention have a negative dielectric anisotropy and have relatively high absolute values of the dielectric anisotropy ($|\Delta\varepsilon|$), which are preferably in the range from ≧2.7 to ≧5.3.

The liquid-crystal media according to the invention have relatively small values for the threshold voltage ($V_0$). They are preferably in the range from 1.7 V to 2.5 V, particularly preferably ≦2.3 V and very particularly preferably ≦2.2 V.

In addition, the liquid-crystal media according to the invention have high values for the voltage holding ratio in liquid-crystal cells. In freshly filled cells at 20° C. in the cells, they are ≧95%, preferably ≧97% and very particularly preferably ≧99% and after 5 minutes in the oven at 100° C. in the cells they are ≧90%, preferably ≧93% and very particularly preferably ≧98%.

In general, liquid-crystal media having a low addressing voltage or threshold voltage have a lower voltage holding ratio than those having a greater addressing voltage or threshold voltage and vice versa.

For the present invention, the term "dielectrically positive compounds" denotes compounds having a $\Delta\varepsilon>1.5$, the term "dielectrically neutral compounds" denotes those having $-1.5\leq\Delta\varepsilon\leq1.5$ and the term "dielectrically negative compounds" denotes those having $\Delta\varepsilon<-1.5$. The dielectric anisotropy of the compounds is determined here by dissolving 10% of the compounds in a liquid-crystalline host and determining the capacitance of the resultant mixture in at least one test cell in each case having a layer thickness of 20 μm with homeotropic and with homogeneous surface alignment at 1 kHz. The measurement voltage is typically 0.5 V to 1.0 V, but is always lower than the capacitive threshold of the respective liquid-crystal mixture investigated.

The host mixture used for dielectrically positive and dielectrically neutral compounds is ZLI-4792 and the host mixture used for dielectrically negative compounds is ZLI-2857, both from Merck KGaA, Germany. The values for the respective compounds to be investigated are obtained from the change in the dielectric constants of the host mixture after addition of the compound to be investigated and extrapolation to 100% of the compound employed. 10% of the compound to be investigated are dissolved in the host mixture. If the solubility of the substance is too low for this, the concentration is halved in steps until the investigation can be carried out at the desired temperature.

All temperature values indicated for the present invention are in ° C.

For the present invention, the term "threshold voltage" relates to the capacitive threshold ($V_0$), also known as the Freedericksz threshold, unless explicitly indicated otherwise. In the examples, as is generally customary, the optical threshold for 10% relative contrast ($V_{10}$) is also determined and quoted.

The electro-optical properties, for example the threshold voltage ($V_0$) (capacitive measurement) and the optical threshold ($V_{10}$), are, like the switching behaviour, determined in test cells produced at Merck KGaA. The measurement cells have soda-lime glass substrates and are produced in an ECB or VA configuration with polyimide alignment layers (SE-1211 with diluent **26 (mixing ratio 1:1), both from Nissan Chemicals, Japan), which are rubbed perpendicular to one another. The area of the transparent, virtually square ITO electrodes is 1 cm². The layer thickness of the test cells used is selected in accordance with the birefringence of the liquid-crystal mixture investigated in such a way that the optical retardation is (0.33±0.01)μm. The polarisers, one of which is located in front of and one of which is located behind the cell, form, with their absorption axes, an angle of 90° to one another and are on their respective adjacent substrate with these axes parallel to the rubbing direction. The layer thickness is usually about 4.0 μm. The cells are filled by means of capillary action under atmospheric pressure and are investigated in the unsealed state. Unless indicated otherwise, a chiral dopant is not added to the liquid-crystal mixtures used, but the latter are also particularly suitable for applications in which doping of this type is necessary.

The electro-optical properties and the response times of the test cells are determined in a DMS 301 measuring instrument from Autronic-Melchers, Karlsruhe, Germany, at a temperature of 20° C. The addressing wave shape used is a rectangular wave having a frequency of 60 Hz. The voltage is quoted as $V_{rms}$ (root mean square). During measurement of the response times, the voltage is increased from 0 V to twice the value of the optical threshold ($2V_{10}$) and back. The response times quoted apply to the entire time that passes from the change in the voltage until 90% of the respective total change in the light intensity occurs, i.e. $\tau_{on} \equiv t(0\%\ \text{to} >90\%)$ and $\tau_{off} \equiv t(100\%\ \text{to} >10\%)$, i.e. also include the respective delay times. Since the individual response times are dependent on the addressing voltage, the sum of the two individual response times ($\Sigma = \tau_{on} + \tau_{off}$) or the average response time ($\tau_{av.} = (\tau_{on} + \tau_{off})/2$) is also quoted in order to improve the comparability of the results.

The voltage holding ratio is determined in test cells produced at Merck KGaA. The measurement cells have soda-lime glass substrates and are produced with polyimide alignment layers (AL-3046 from Japan Synthetic Rubber, Japan) with a layer thickness of 50 nm, which are rubbed perpendicular to one another. The layer thickness is uniformly 6.0 μm. The area of the transparent ITO electrodes is 1 cm².

The mixtures according to the invention are suitable for all VA-TFT applications, such as, for example, VAN, MVA, (S)-PVA and ASV. They are furthermore suitable for IPS (in-plane switching), FFS (fringe field switching) and PALC applications of negative $\Delta\epsilon$.

The nematic liquid-crystal mixtures in the displays according to the invention generally comprise two components A and B, which themselves consist of one or more individual compounds.

Component A has significantly negative dielectric anisotropy and gives the nematic phase a dielectric anisotropy of ≦−0.5. It preferably comprises compounds of the formulae I, IIA, IIB and/or III.

The proportion of component A is preferably between 45 and 100%, in particular between 60 and 100%.

For component A, one (or more) individual compound(s) which has (have) a value of $\Delta\epsilon$ of ≦−0.8 is (are) preferably selected. This value must be more negative, the smaller the proportion A in the mixture as a whole.

Component B has pronounced nematogeneity and a flow viscosity of not greater than 30 mm²·s⁻¹, preferably not greater than 25 mm²·s⁻¹, at 20° C.

Particularly preferred individual compounds in component B are extremely low-viscosity nematic liquid crystals having a flow viscosity of not greater than 18 mm²·s⁻¹, preferably not greater than 12 mm²·s⁻¹, at 20° C.

Component B is monotropically or enantiotropically nematic, has no smectic phases and is able to prevent the occurrence of smectic phases down to very low temperatures in liquid-crystal mixtures. For example, if various materials of high nematogeneity are added to a smectic liquid-crystal mixture, the nematogeneity of these materials can be compared through the degree of suppression of smectic phases that is achieved.

A multiplicity of suitable materials is known to the person skilled in the art from the literature. Particular preference is given to compounds of the formula III.

In addition, these liquid-crystal phases may also comprise more than 18 components, preferably 18 to 25 components.

The phases preferably comprise 4 to 15, in particular 5 to 12, and particularly preferably <10, compounds of the formulae I, IIA and/or IIB and optionally III.

Besides compounds of the formulae I, IIA and/or IIB and III, other constituents may also be present, for example in an amount of up to 45% of the mixture as a whole, but preferably up to 35%, in particular up to 10%.

The other constituents are preferably selected from nematic or nematogenic substances, in particular known substances, from the classes of the azoxybenzenes, benzylideneanilines, biphenyls, terphenyls, phenyl or cyclohexyl benzoates, phenyl or cyclohexyl cyclohexanecarboxylates, phenylcyclohexanes, cyclohexylbiphenyls, cyclohexylcyclohexanes, cyclohexylnaphthalenes, 1,4-biscyclohexylbiphenyls or cyclohexylpyrimidines, phenyl- or cyclohexyldioxanes, optionally halogenated stilbenes, benzyl phenyl ethers, tolans and substituted cinnamic acid esters.

The most important compounds which are suitable as constituents of liquid-crystal phases of this type can be characterised by the formula IV

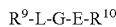            IV in which L and E each denote a carbo- or heterocyclic ring system from the group formed by 1,4-disubstituted benzene and cyclohexane rings, 4,4'-disubstituted biphenyl, phenylcyclohexane and cyclohexylcyclohexane systems, 2,5-disubstituted pyrimidine and 1,3-dioxane rings, 2,6-disubstituted naphthalene, di- and tetrahydronaphthalene, quinazoline and tetrahydroquinazoline,

| G denotes | —CH=CH— | —N(O)=N— |
|---|---|---|
| | —CH=CQ— | —CH=N(O)— |
| | —C≡C— | —CH₂—CH₂— |
| | —CO—O— | —CH₂—O— |
| | —CO—S— | —CH₂—S— |
| | —CH=N— | —COO—Phe—COO— |
| | —CF₂O— | —CF=CF— |
| | —OCF₂— | —OCH₂— |
| | —(CH₂)₄— | —(CH₂)₃O— | or a C—C single bond, Q denotes halogen, preferably chlorine, or —CN, and $R^9$ and $R^{10}$ each denote alkyl, alkenyl, alkoxy, alkanoyloxy or alkoxycarbonyloxy having up to 18, preferably up to 8, carbon atoms, or one of these radicals alternatively denotes CN, NC, NO₂, NCS, CF₃, OCF₃, F, Cl or Br.

In most of these compounds, $R^9$ and $R^{10}$ are different from one another, one of these radicals usually being an alkyl or alkoxy group. Other variants of the proposed substituents are also common. Many such substances or also mixtures thereof are commercially available. All these substances can be prepared by methods known from the literature.

It goes without saying for the person skilled in the art that the VA, IPS, FFS or PALC mixture according to the invention may also comprise compounds in which, for example, H, N, O, Cl and F have been replaced by the corresponding isotopes.

The construction of the liquid-crystal displays according to the invention corresponds to the usual geometry, as described, for example, in EP-A 0 240 379.

The following examples are intended to explain the invention without limiting it. Above and below, percentages denote percent by weight; all temperatures are indicated in degrees Celsius.

Besides the compounds of the formula I, the mixtures according to the invention preferably comprise one or more of the compounds shown below.

The following abbreviations are used:

(m, m, z: each, independently of one another, 1, 2, 3, 4, 5 or 6)

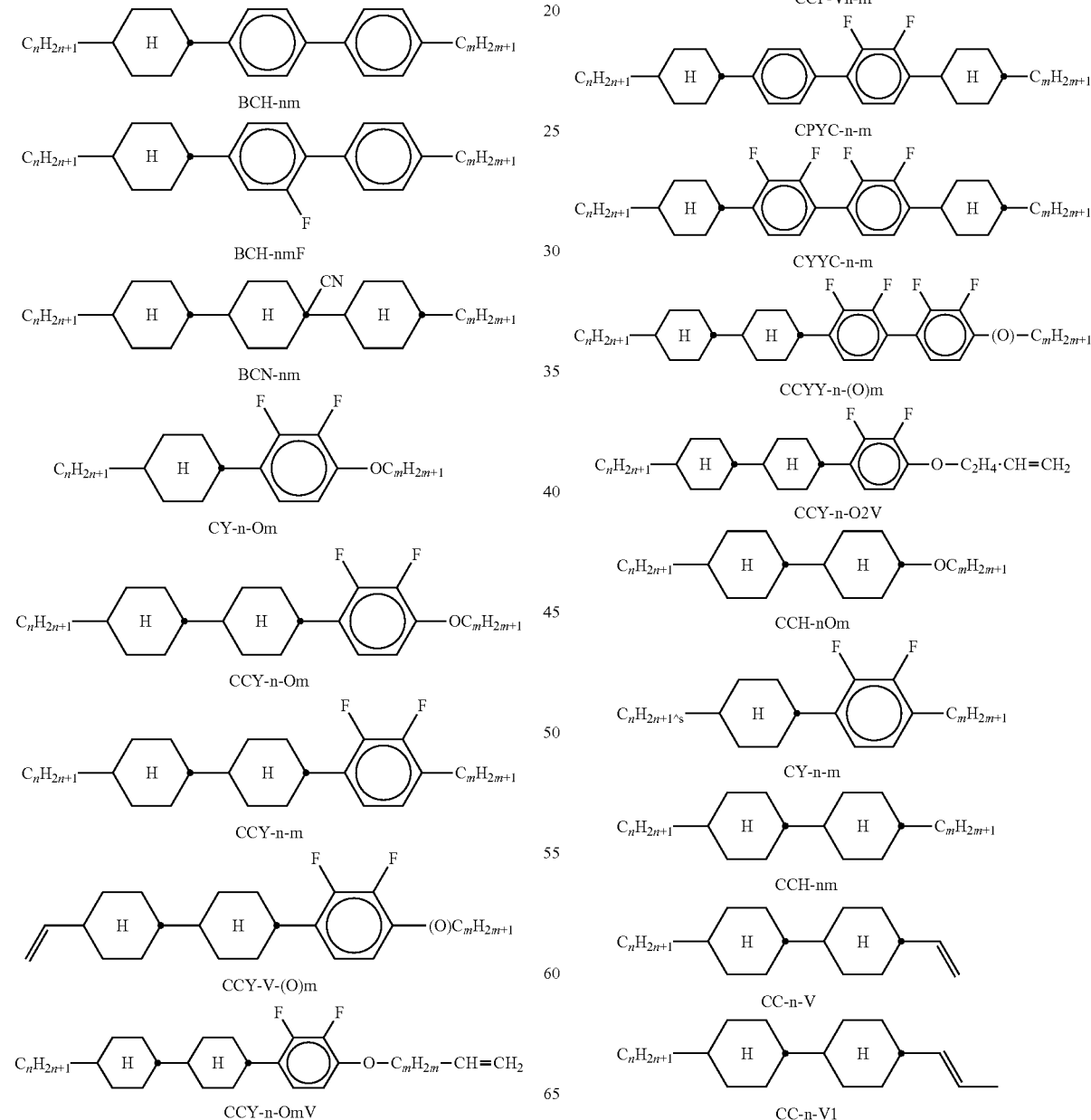

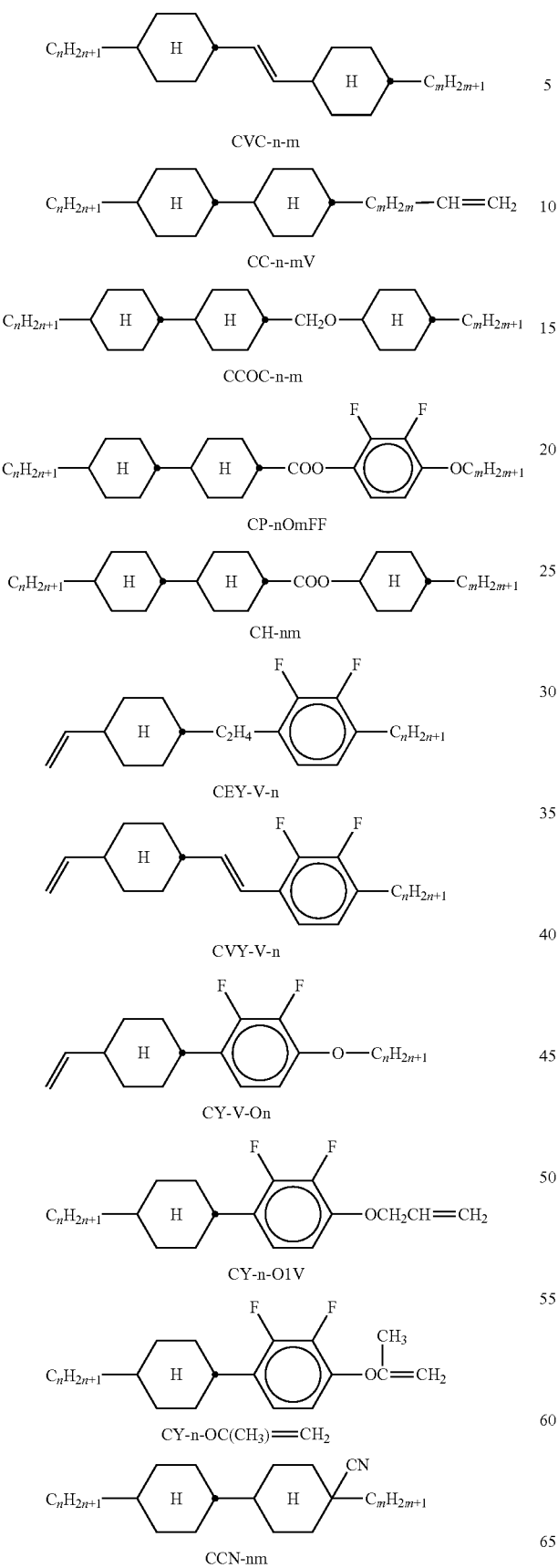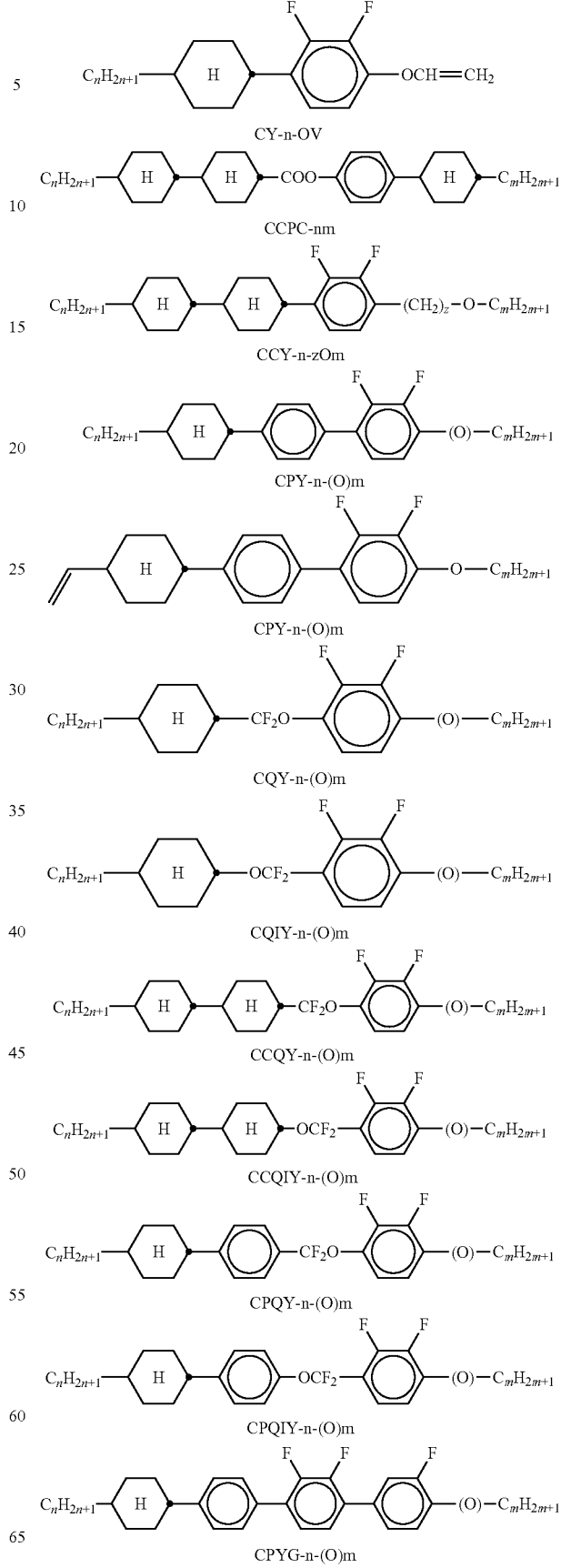

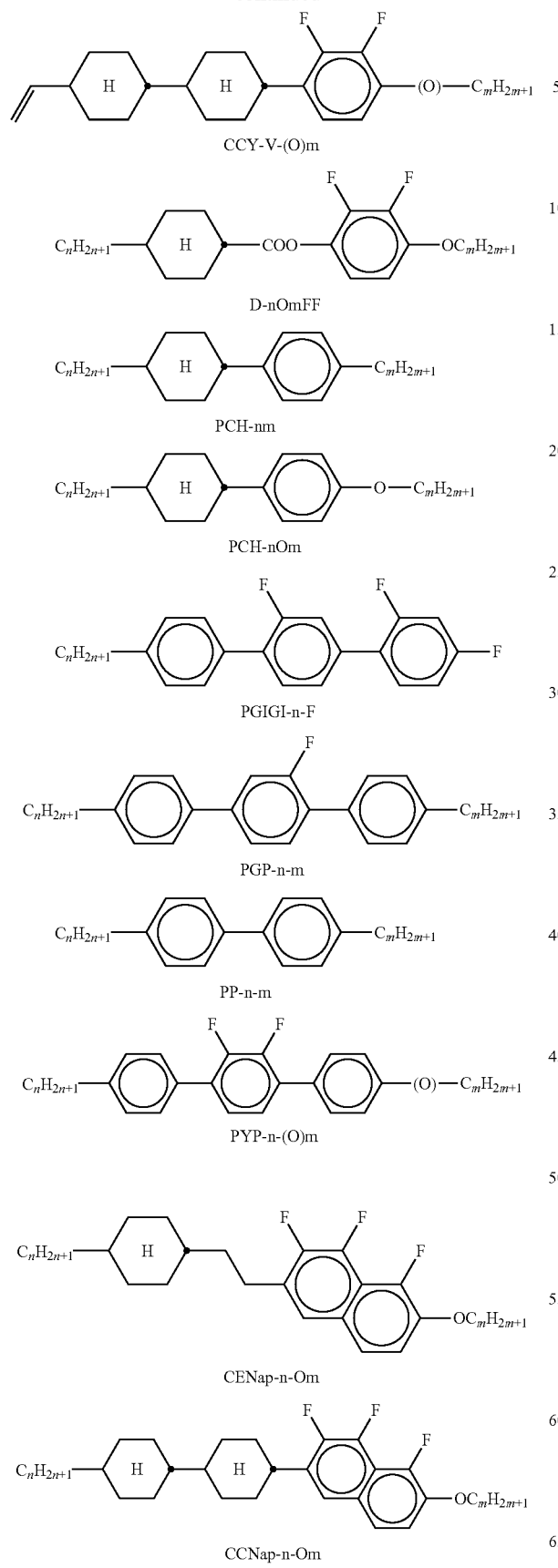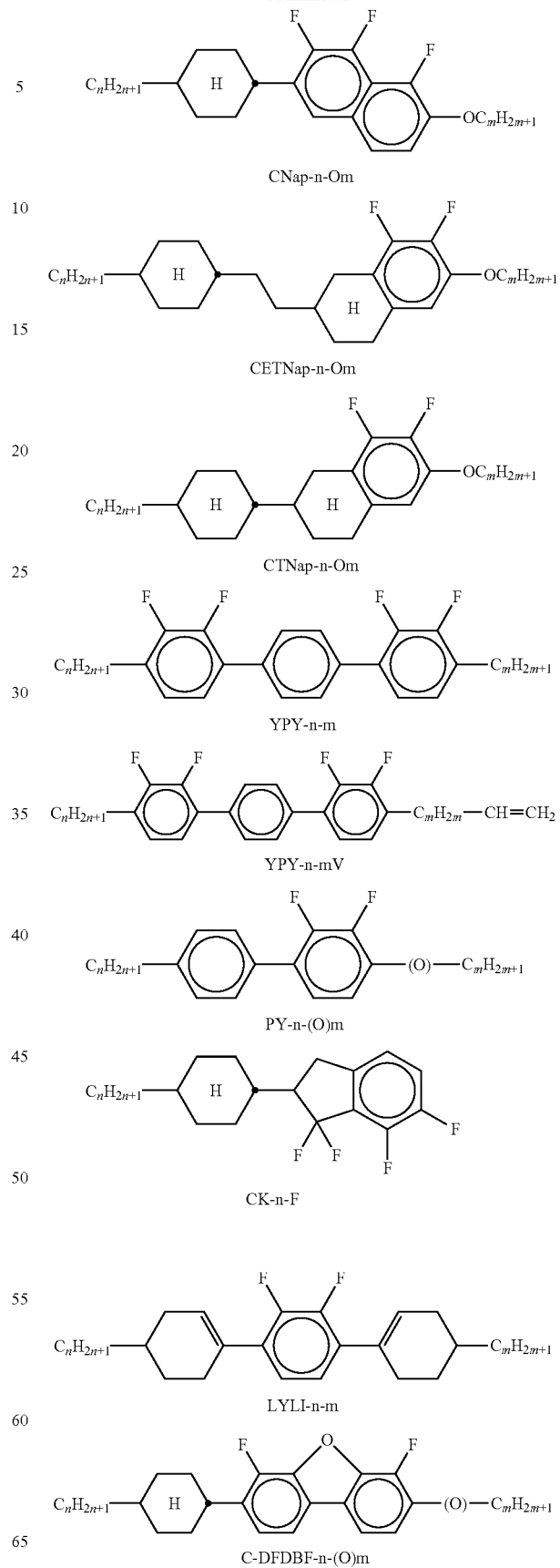

-continued

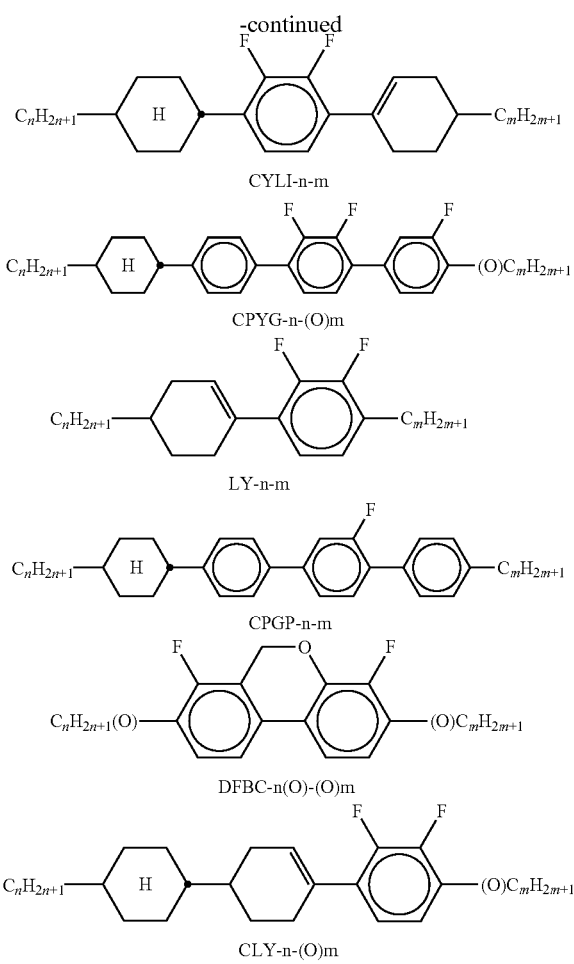

The liquid-crystal mixtures which can be used in accordance with the invention are prepared in a manner which is conventional per se. In general, the desired amount of the components used in lesser amount is dissolved in the components making up the principal constituent, advantageously at elevated temperature. It is also possible to mix solutions of the components in an organic solvent, for example in acetone, chloroform or methanol, and to remove the solvent again, for example by distillation, after thorough mixing.

The dielectrics may also comprise further additives known to the person skilled in the art and described in the literature, such as, for example, UV absorbers, antioxidants, nanoparticles and free-radical scavengers. For example, 0-15% of pleochroic dyes, stabilisers or chiral dopants may be added.

For example, 0-15% of pleochroic dyes may be added, furthermore conductive salts, preferably ethyldimethyldodecylammonium 4-hexoxybenzoate, tetrabutylammonium tetraphenylboranate or complex salts of crown ethers (cf., for example, Haller et al., Mol. Cryst. Liq. Cryst. Volume 24, pages 249-258 (1973)), may be added in order to improve the conductivity or substances may be added in order to modify the dielectric anisotropy, the viscosity and/or the alignment of the nematic phases. Substances of this type are described, for example, in DE-A 22 09 127, 22 40 864, 23 21 632, 23 38 281, 24 50 088, 26 37 430 and 28 53 728.

Table A shows possible dopants which can be added to the mixtures according to the invention. If the mixtures comprise a dopant, it is employed in amounts of 0.01-4% by weight, preferably 0.1-1.0% by weight.

TABLE A

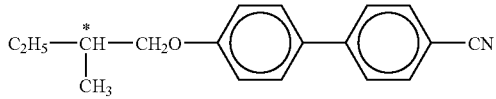

C 15

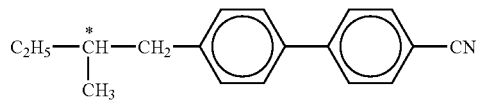

CB 15

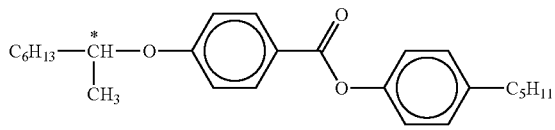

CM 21

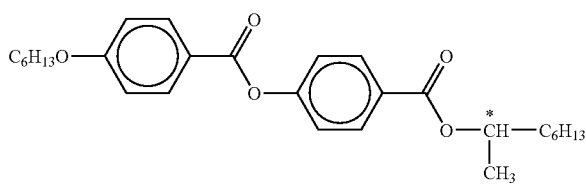

R/S-811

TABLE A-continued
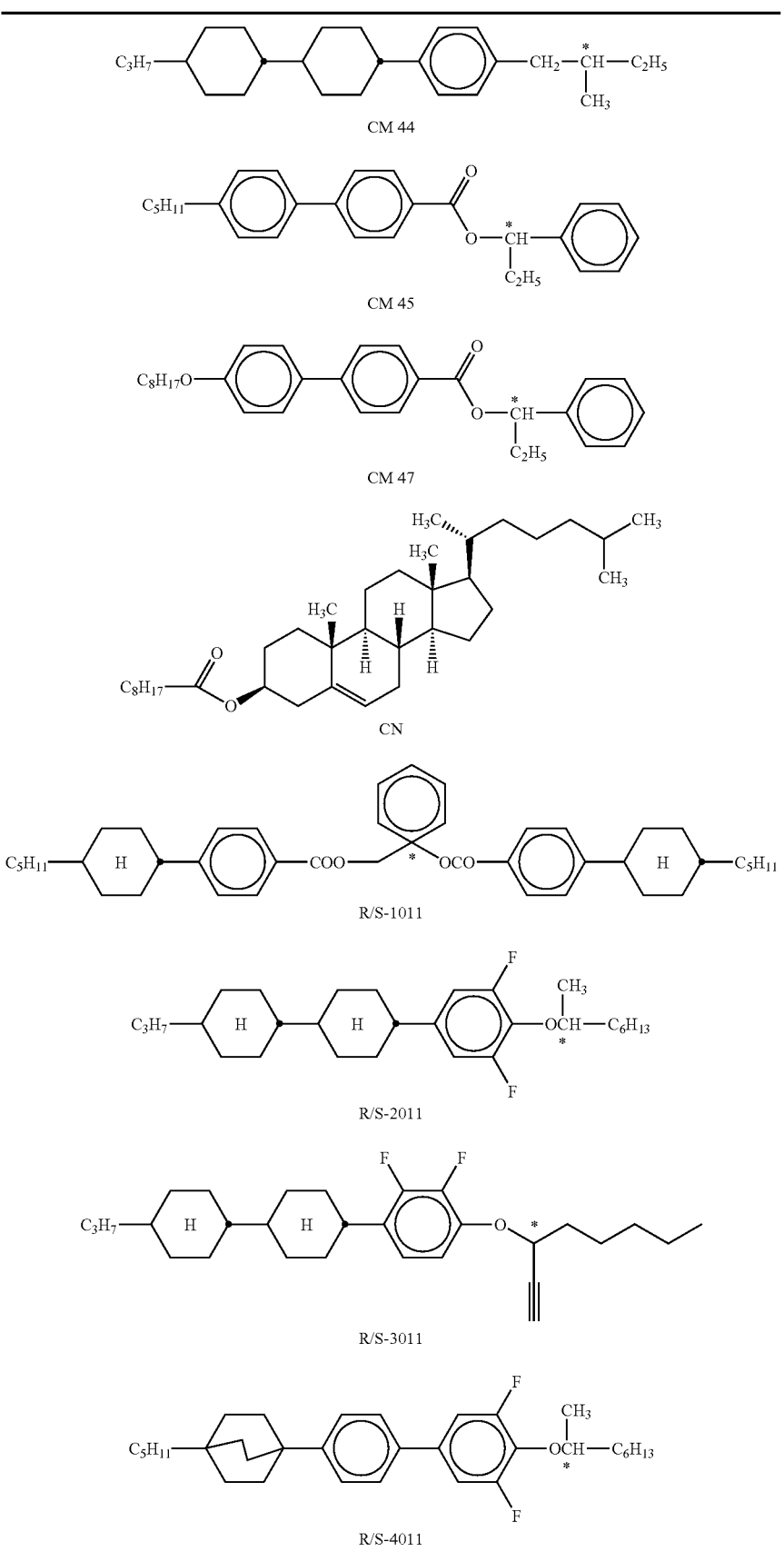

TABLE A-continued
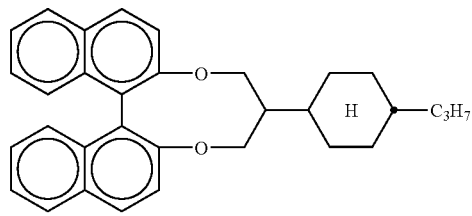
R/S-5011
Stabilisers which can be added, for example, to the mixtures according to the invention are shown below in Table B.
TABLE B
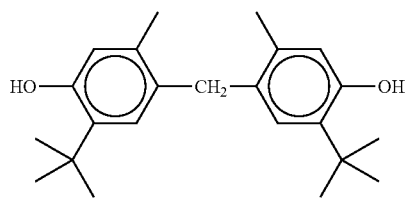
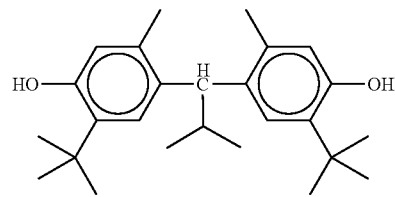
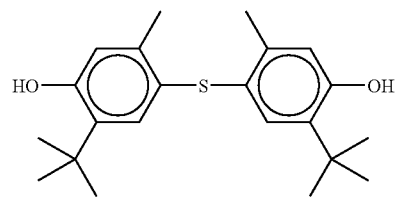
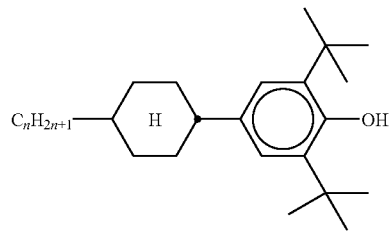
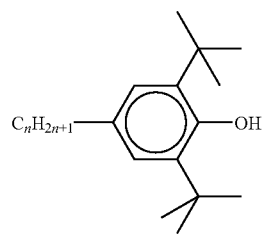

TABLE B-continued
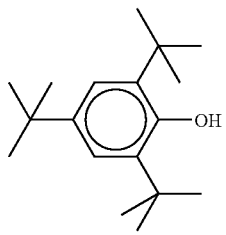
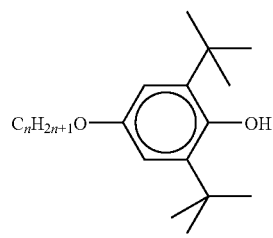
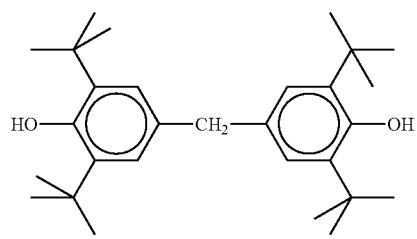
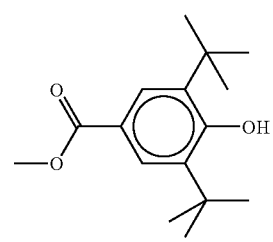
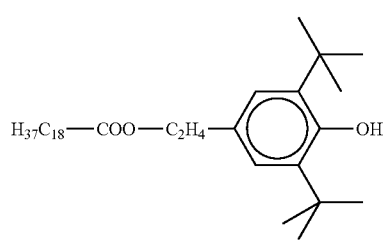
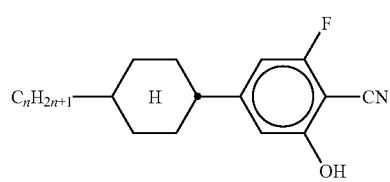
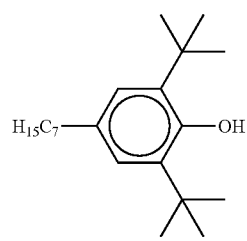

TABLE B-continued
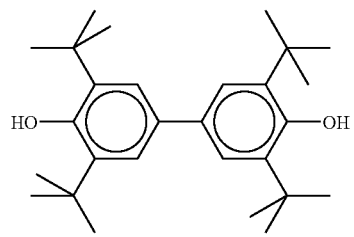
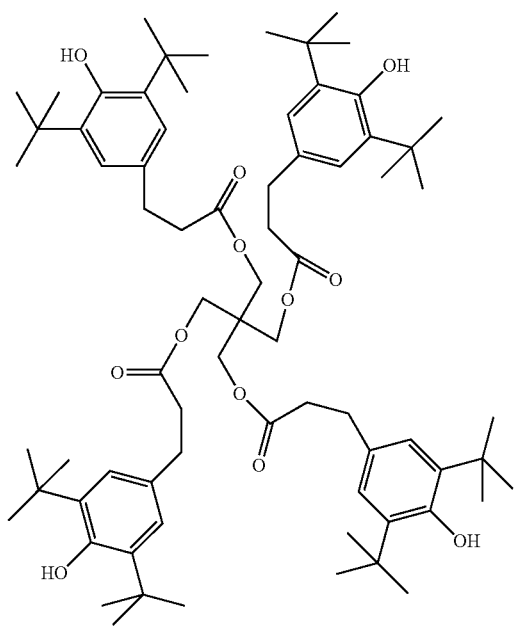
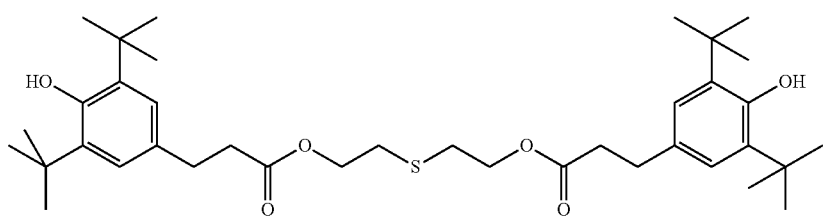
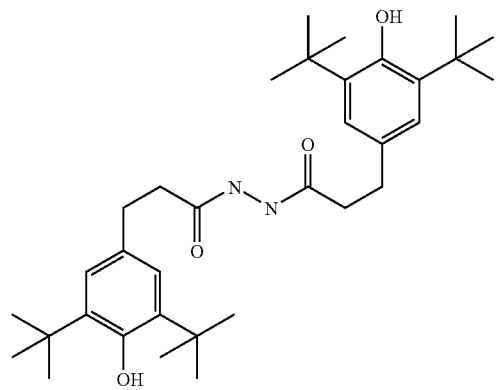

TABLE B-continued
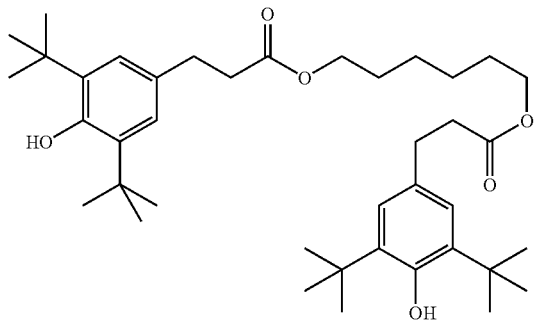
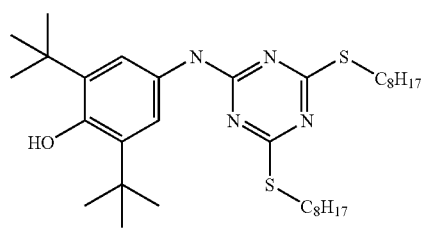
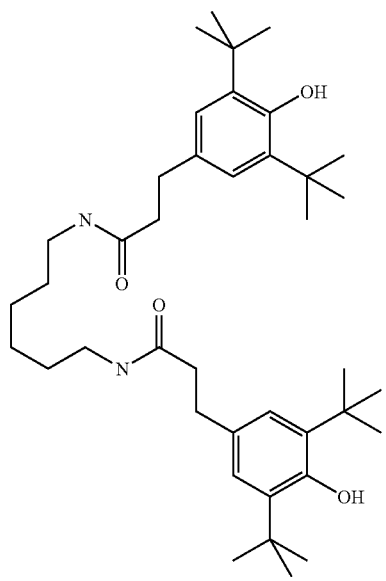
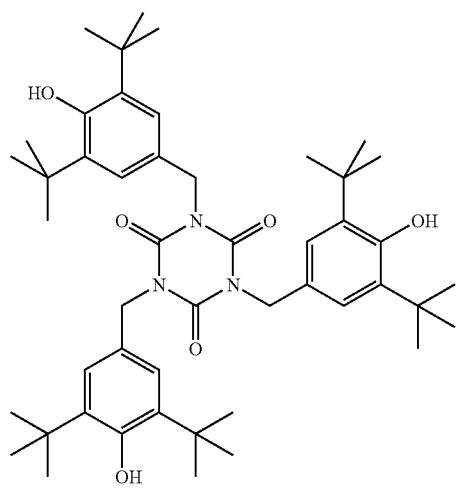

TABLE B-continued
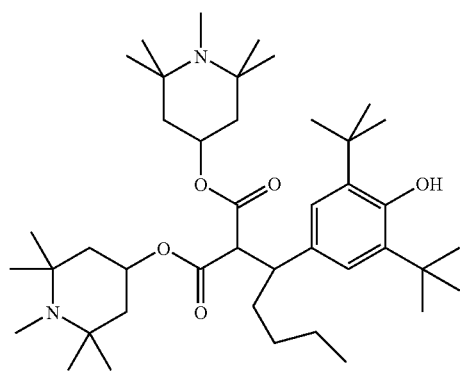
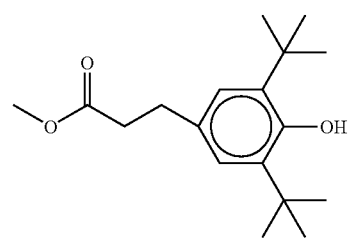
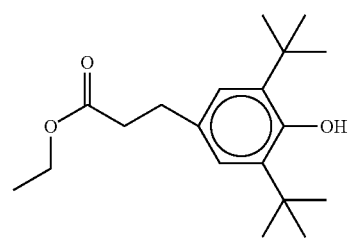
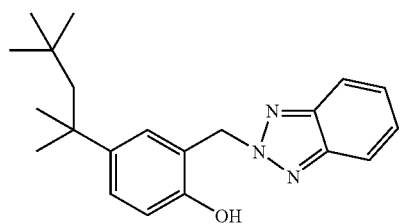
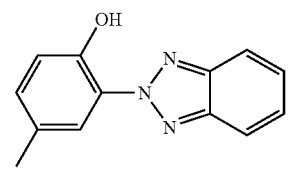
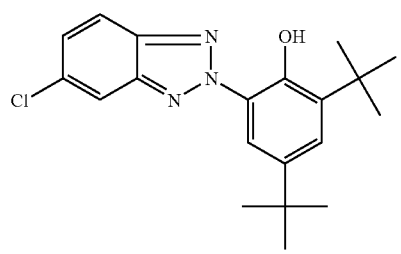

TABLE B-continued
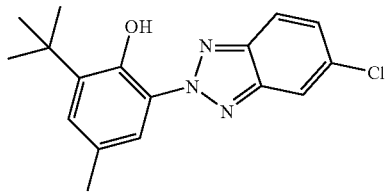
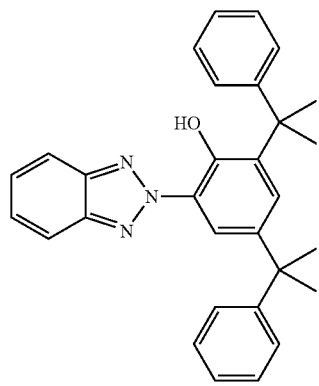
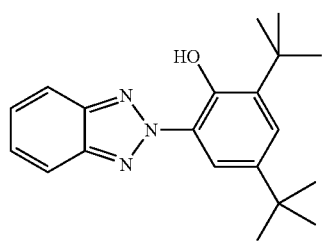
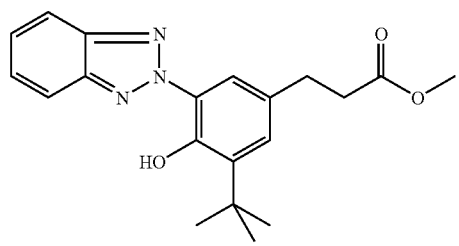
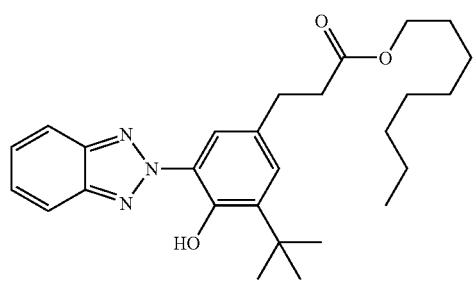

TABLE B-continued
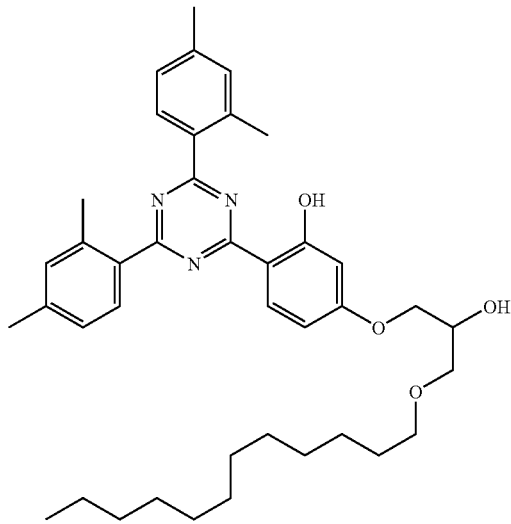
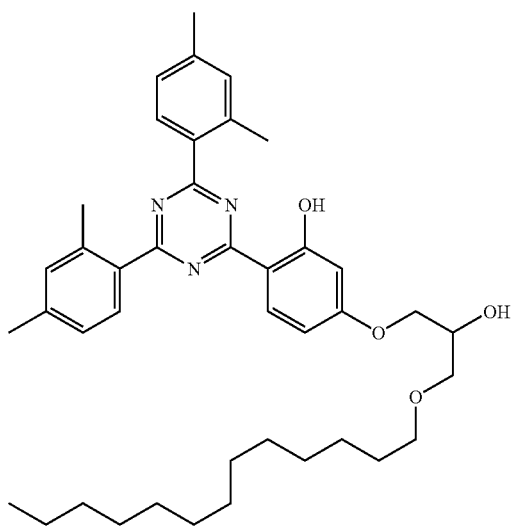
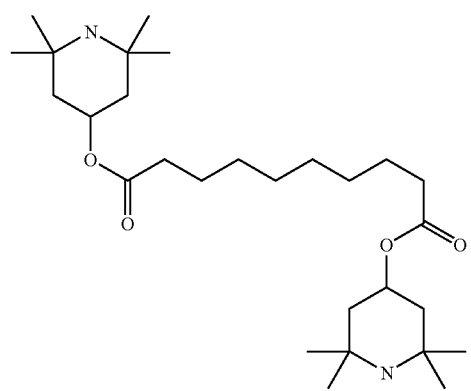

TABLE B-continued

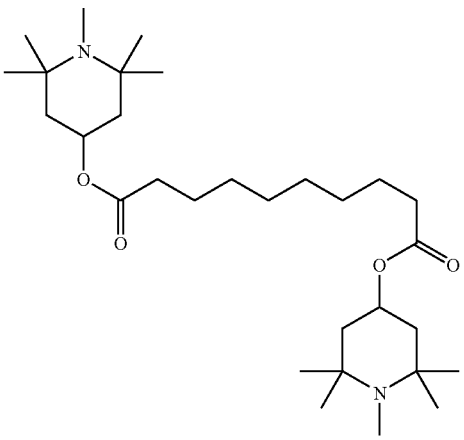

(n = 1-12)

The following examples are intended to explain the invention without limiting it. Above and below,

| | |
|---|---|
| $V_o$ | denotes the threshold voltage, capacitive [V] at 20° C. |
| $\Delta n$ | denotes the optical anisotropy measured at 20° C. and 589 nm |
| $\Delta\epsilon$ | denotes the dielectric anisotropy at 20° C. and 1 kHz |
| cl. p. | denotes the clearing point [° C.] |
| $K_1$ | denotes the elastic constant, "splay" deformation at 20° C. [pN] |
| $K_3$ | denotes the elastic constant, "bend" deformation at 20° C. [pN] |
| $\gamma_1$ | denotes the rotational viscosity measured at 20° C. [mPa · s] |
| LTS | denotes the low-temperature stability (nematic phase), determined in test cells |

The display used for measurement of the threshold voltage has two plane-parallel outer plates at a separation of 20 μm and electrode layers with overlying alignment layers of SE-1211 (Nissan Chemicals) on the insides of the outer plates, which effect a homeotropic alignment of the liquid crystals.

MIXTURE EXAMPLES

Example 1

| | | | |
|---|---|---|---|
| CY-3-O2 | 20.00% | Clearing point [° C.]: | +78.0 |
| CCY-3-O2 | 8.00% | $\Delta n$ [589 nm, 20° C.]: | +0.0831 |
| CCY-3-O3 | 12.00% | $\Delta\epsilon$ [1 kHz, 20° C.]: | −3.5 |
| CCY-4-O2 | 11.00% | $K_1$ [pN, 20° C.]: | 12.7 |
| CPY-2-O2 | 10.00% | $K_3$ [pN, 20° C.]: | 14.8 |
| CC-3-V | 39.00% | $V_0$ [V, 20° C.]: | 2.16 |
| | | $\gamma_1$ [mPa · s, 20° C.]: | 96 |
| | | LTS cells [−20° C.]: | >1000 h |
| | | LTS cells [−30° C.]: | >1000 h |

Example 2

| | | | |
|---|---|---|---|
| CY-3-O2 | 20.00% | Clearing point [° C.]: | +80.0 |
| CY-5-O2 | 4.00% | $\Delta n$ [589 nm, 20° C.]: | +0.0839 |
| CCY-3-O2 | 11.00% | $\Delta\epsilon$ [1 kHz, 20° C.]: | −3.6 |
| CCY-3-O3 | 13.00% | $K_1$ [pN, 20° C.]: | 12.9 |
| CCY-4-O2 | 9.00% | $K_3$ [pN, 20° C.]: | 15.6 |
| CC-3-V | 38.00% | $V_0$ [V, 20° C.]: | 2.21 |
| CPYG-2-O2 | 5.00% | $\gamma_1$ [mPa · s, 20° C.]: | 102 |
| | | LTS cells [−20° C.]: | >1000 h |

Example 3

| | | | |
|---|---|---|---|
| CY-3-O2 | 17.00% | Clearing point [° C.]: | +83.0 |
| CCY-3-O2 | 12.00% | $\Delta n$ [589 nm, 20° C.]: | +0.0829 |
| CCY-3-O3 | 12.00% | $\Delta\epsilon$ [1 kHz, 20° C.]: | −3.5 |
| CCY-4-O2 | 9.00% | $K_1$ [pN, 20° C.]: | 13.0 |
| CPY-2-O2 | 11.00% | $K_3$ [pN, 20° C.]: | 13.4 |
| CC-4-V | 39.00% | $V_0$ [V, 20° C.]: | 2.08 |
| | | $\gamma_1$ [mPa · s, 20° C.]: | 106 |
| | | LTS cells [−20° C.]: | >1000 h |

Example 4

| | | | |
|---|---|---|---|
| CY-3-O2 | 3.00% | Clearing point [° C.]: | +83.5 |
| CCY-3-O2 | 12.00% | $\Delta n$ [589 nm, 20° C.]: | +0.0805 |
| CCY-4-O2 | 12.00% | $\Delta\epsilon$ [1 kHz, 20° C.]: | −3.9 |
| CPY-3-O2 | 10.00% | $K_1$ [pN, 20° C.]: | 13.7 |
| CC-3-V | 42.00% | $K_3$ [pN, 20° C.]: | 16.5 |
| CK-3-F | 7.00% | $V_0$ [V, 20° C.]: | 2.16 |
| CK-5-F | 7.00% | $\gamma_1$ [mPa · s, 20° C.]: | 96 |
| CK-4-F | 7.00% | | |

Example 5

| | | | |
|---|---|---|---|
| CY-3-O2 | 16.00% | Clearing point [° C.]: | +77.0 |
| CCY-3-O2 | 11.00% | $\Delta n$ [589 nm, 20° C.]: | +0.1064 |
| CCY-3-O3 | 6.00% | $\Delta\epsilon$ [1 kHz, 20° C.]: | −3.0 |
| CPY-2-O2 | 7.00% | $K_1$ [pN, 20° C.]: | 12.8 |
| CPY-3-O2 | 7.00% | $K_3$ [pN, 20° C.]: | 14.6 |

| | | -continued | |
|---|---|---|---|
| PYP-2-3 | 14.00% | $V_0$ [V, 20° C.]: | 2.34 |
| CC-3-V | 39.00% | $\gamma_1$ [mPa·s, 20° C.]: | 89 |

Example 6

| | | | |
|---|---|---|---|
| CC-3-V | 30.00% | Clearing point [° C.]: | +89.0 |
| CCP-V-1 | 10.00% | $\Delta n$ [589 nm, 20° C.]: | +0.1431 |
| CY-5-O2 | 4.00% | $\Delta\epsilon$ [1 kHz, 20° C.]: | −3.4 |
| CPY-3-O2 | 10.00% | $\gamma_1$ [mPa·s, 20° C.]: | 143 |
| CPY-2-O2 | 10.00% | | |
| PYP-2-3 | 12.00% | | |
| PYP-2-4 | 12.00% | | |

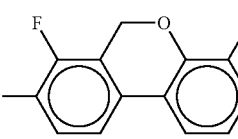

8.00%

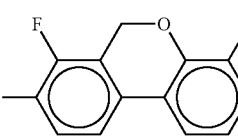

4.00%

Example 7

| | | | |
|---|---|---|---|
| CC-3-V | 35.00% | Clearing point [° C.]: | +76.0 |
| CC-4-V | 20.00% | $\Delta n$ [589 nm, 20° C.]: | +0.0944 |
| CCY-3-O3 | 10.00% | $\Delta\epsilon$ [1 kHz, 20° C.]: | −3.3 |
| CPY-3-O2 | 10.00% | $\gamma_1$ [mPa·s, 20° C.]: | 80 |
| CPY-2-O2 | 10.00% | | |

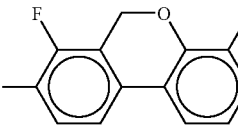

9.00%

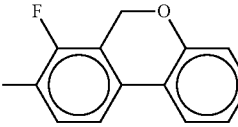

3.00%

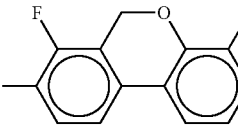

3.00%

Example 8

| | | | |
|---|---|---|---|
| CC-3-V | 35.00% | Clearing point [° C.]: | +71.0 |
| CC-4-V | 10.00% | $\Delta n$ [589 nm, 20° C.]: | +0.0820 |
| CCP-V-1 | 13.00% | $\Delta\epsilon$ [1 kHz, 20° C.]: | −3.6 |
| CK-3-F | 5.00% | $\gamma_1$ [mPa·s, 20° C.]: | 78 |
| CK-4-F | 7.00% | | |
| CK-5-F | 5.00% | | |

-continued

| | |
|---|---|
| CCY-3-O3 | 10.00% |

 9.00%

3.00%

3.00%

The invention claimed is:

1. A liquid-crystalline medium having negative dielectric anisotropy based on a mixture of polar compounds, which comprises at least one compound of the formula I2

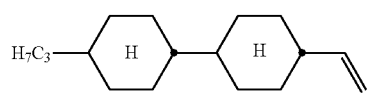   I2 in amounts of 30-60% by weight, based on the medium; and one or more compounds of formulae IIA and/or IIB

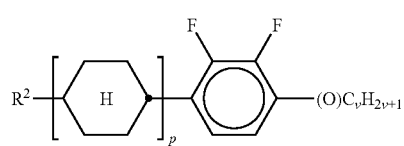   IIA

IIB in which
R² denotes an alkyl or alkenyl radical having up to 15 C atoms which is unsubstituted, monosubstituted by CN or CF₃ or at least monosubstituted by halogen, where, in addition, one or more CH₂ groups in these radicals are each optionally replaced by —O—, —S—, —C≡C—, —CF₂O—, —OCF₂—, —OC—O— or —O—CO— in such a way that O atoms are not linked directly to one another,
p denotes 1 or 2, and
v denotes 1 to 6.

2. The liquid-crystalline medium according to claim 1, wherein said medium further comprises one or more compounds of formula III

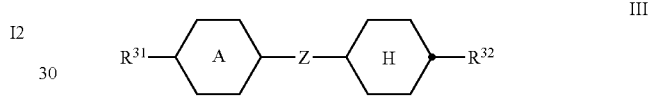   III in which
$R^{31}$ and $R^{32}$ each, independently of one another, denote a straight-chain alkyl, alkoxyalkyl or alkoxy radical having up to 12 C atoms,

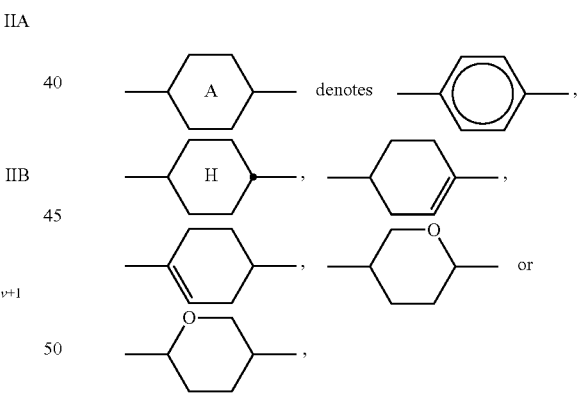

and
Z denotes a single bond, —CH₂CH₂—, —CH=CH—, —CF₂O—, —OCF₂—, —CH₂O—, —OCH₂—, —COO—, —OCO—, —C₂F₄— or —CF=CF—.

3. The liquid-crystalline medium according to claim 1, wherein the proportion of compounds of formula I2 in the mixture as a whole is at least 35% by weight.

4. The liquid-crystalline medium according to claim 1, wherein the proportion of compounds of formulae IIA and/or IIB in the mixture as a whole is at least 20% by weight.

5. The liquid-crystalline medium according to claim 2, wherein the proportion of compounds of formula III in the mixture as a whole is at least 3% by weight.

6. The liquid-crystalline medium according to claim 1, wherein said medium comprises at least one compound selected from formulae I1 and I3 to I9

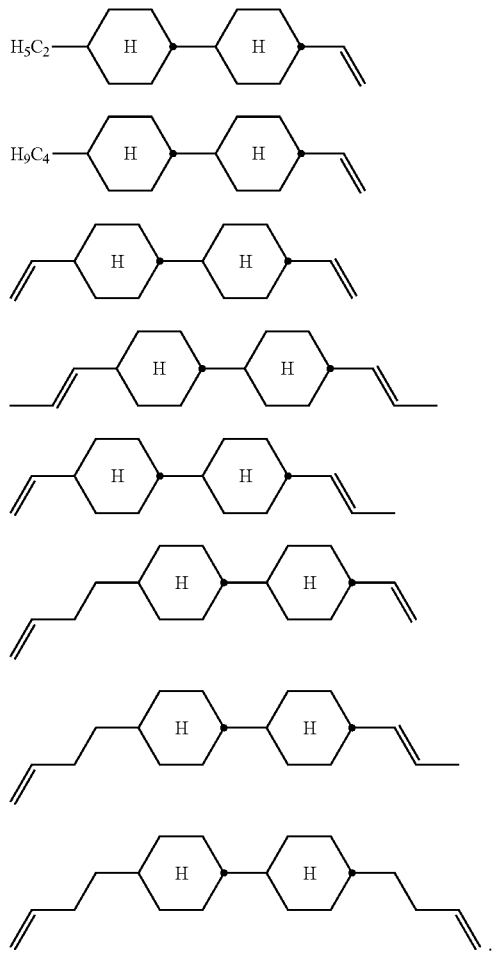

7. A process for the preparation of a liquid-crystalline medium according to claim 1, comprising mixing the compound of formula I2 with at least one further liquid-crystalline compound, and optionally adding additives.

8. An electro-optical display with active-matrix addressing based on the ECB, PALC, FFS or IPS effect, wherein said display contains, as dielectric, a liquid-crystalline medium according to claim 1.

9. The medium according to claim 1, wherein said medium further contains a compound of formula I3

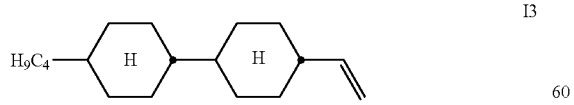

wherein the total concentration of the compounds of formulae I2 and I3 in the medium is ≧40% by weight.

10. The liquid-crystalline medium according to claim 1, wherein said medium additionally comprises one or more compounds selected from formulae IIIa to IIIh:

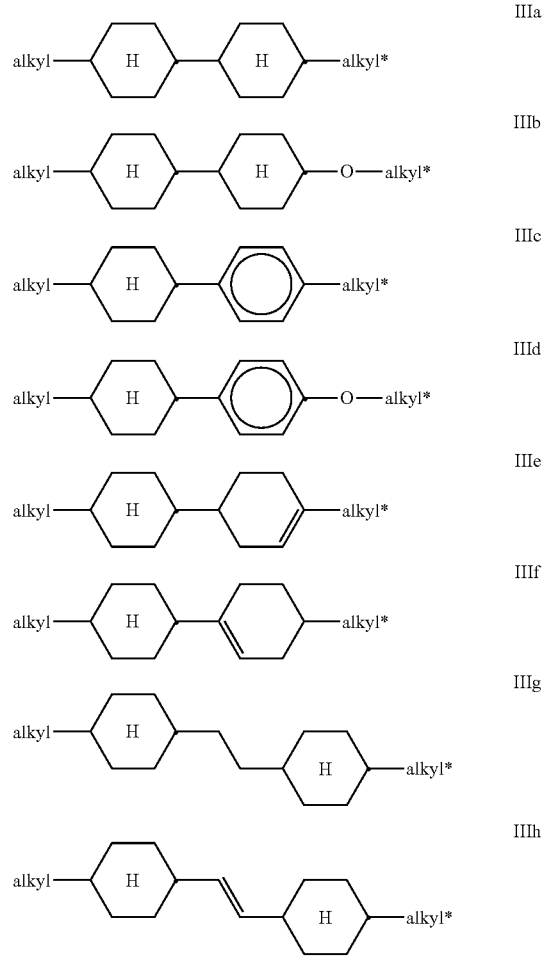

wherein alkyl and alkyl* each, independently of one another, denote a straight-chain alkyl having 1-6 C atoms.

11. The liquid-crystalline medium according to claim 1, wherein said medium additionally comprises one or more fluorinated terphenyls of formulae T-1 to T-22

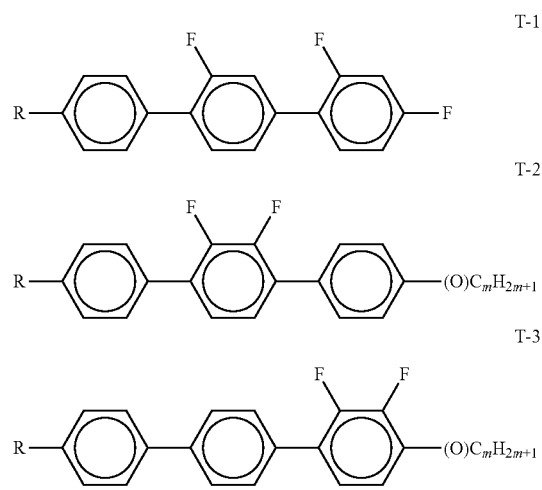

-continued
T-4
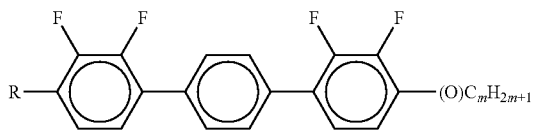
T-5
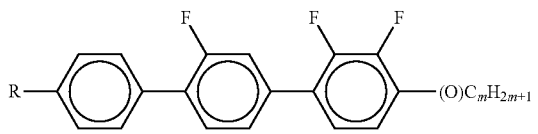
T-6
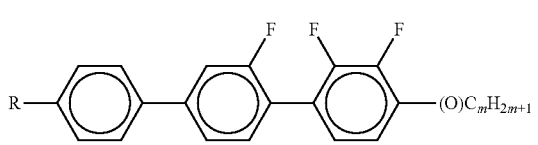
T-7
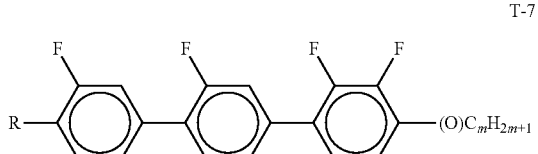
T-9
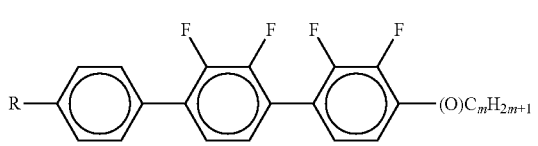
T-10
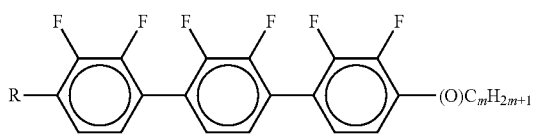
T-11
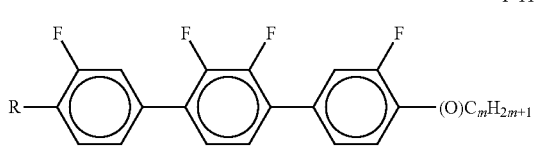
T-12
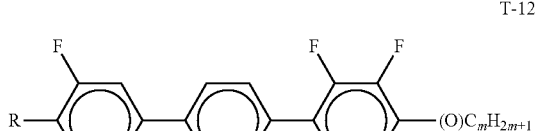
T-13
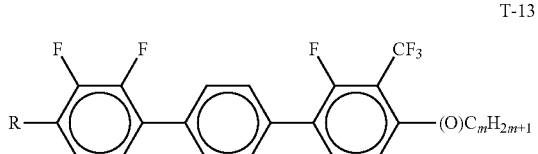
T-14
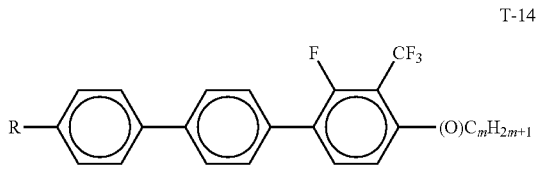
-continued
T-15
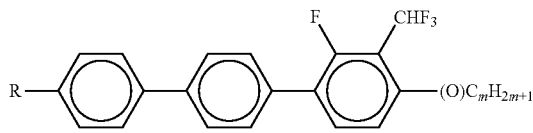
T-16
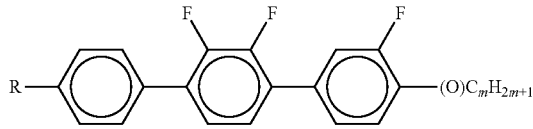
T-17
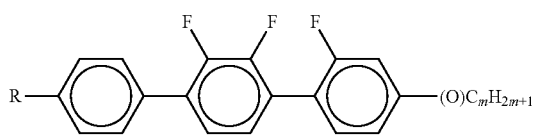
T-18
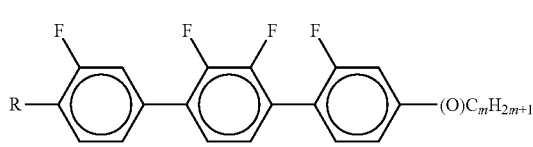
T-19
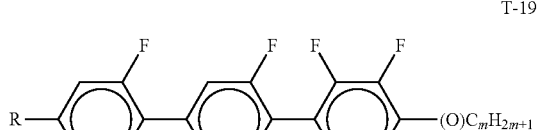
T-20
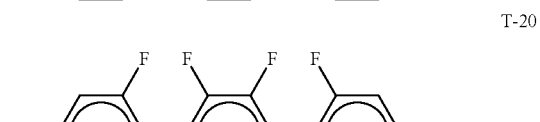
T-21
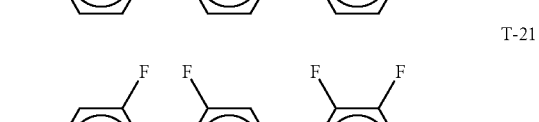
T-22
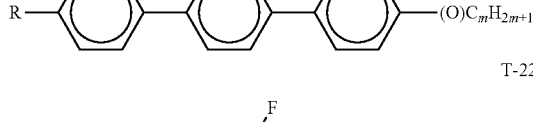
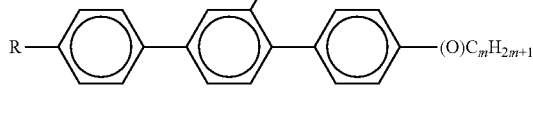
wherein
R is an alkyl or alkenyl radical having up to 15 C atoms which is unsubstituted, monosubstituted by CN or CF$_3$ or at least monosubstituted by halogen, where, in addition, one or more CH$_2$ groups in these radicals are each optionally replaced by —O—, —S—,
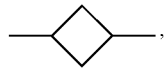

—C≡C—, —CF$_2$O—, —OCF$_2$—, —OC—O— or —O—CO— in such a way that O atoms are not linked directly to one another.

12. The liquid-crystalline medium according to claim 1, wherein said medium additionally comprises one or more compounds of the formulae

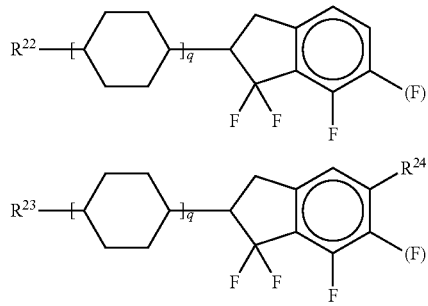

where

R$^{22-23}$ are each, independently of one another, an alkyl or alkenyl radical having up to 4 C atoms which is unsubstituted, monosubstituted by CN or CF$_3$ or at least monosubstituted by halogen, where, in addition, one or more CH$_2$ groups in these radicals are each optionally replaced by —O—, —S—,

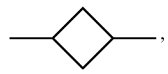

—C≡C—, —CF$_2$O—, —OCF$_2$—, —OC—O— or —O—CO— in such a way that O atoms are not linked directly to one another, R$^{24}$ is CH$_3$, C$_2$H$_5$ or n-C$_3$H$_7$, and q is 1 or 2.

13. The liquid-crystalline medium according to claim 1, wherein said medium additionally comprises at least one compound of the formulae O-1 to O-12

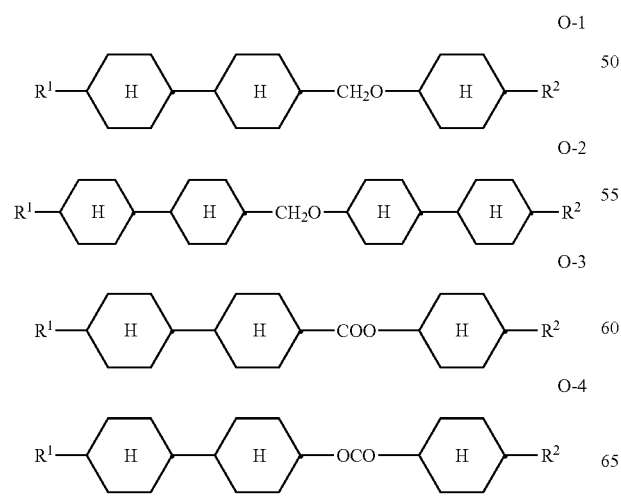

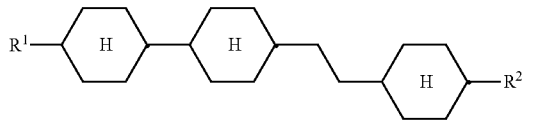

O-5

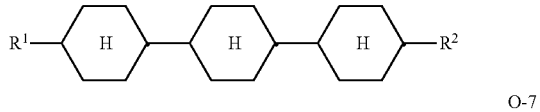

O-6

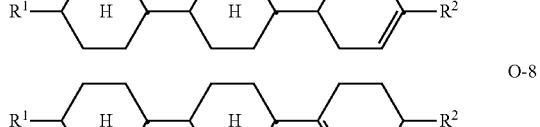

O-7

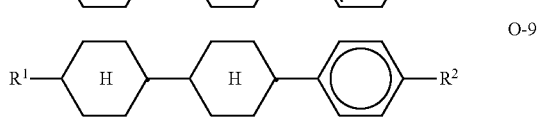

O-8

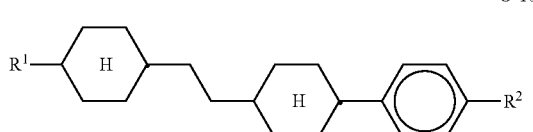

O-9

O-10

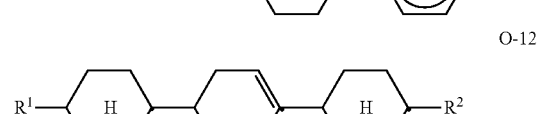

O-11

O-12 wherein

R$^1$ and R$^2$ are each, independently of one another, is an alkyl or alkenyl radical having up to 15 C atoms which is unsubstituted, monosubstituted by CN or CF$_3$ or at least monosubstituted by halogen, where, in addition, one or more CH$_2$ groups in these radicals are each optionally replaced by —O—, —S—,

,

—C≡C—, —CF$_2$O—, —OCF$_2$—, —OC—O— or —O—CO— in such a way that O atoms are not linked directly to one another.

14. The liquid-crystalline medium according to claim 1, wherein said medium 35-60% by weight of said compound of formula I2.

15. The liquid-crystalline medium according to claim 9, wherein said medium contains 30-40% by weight of said compound of formula I3.

16. The liquid-crystalline medium according to claim 9, wherein the total concentration of the compounds of formulae I2 and I3 in the medium is ≧45% by weight.

17. The liquid-crystalline medium according to claim 10, wherein said medium contains at least one compound of the formula IIIa, formula IIIb and/or formula IIId.

18. The liquid-crystalline medium according to claim 11, wherein said medium contains 2-30% by weight of compounds of formulae T-1 to T-22.

19. The liquid-crystalline medium according to claim 11, wherein said medium contains at least one compound selected from formulae T-1, T-2, T-3 and T-22.

20. The liquid-crystalline medium according to claim 12, wherein said medium contains 5-25% by weight of compounds of the formulae

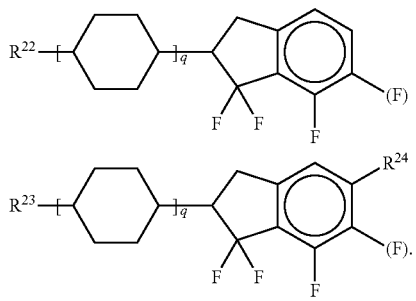

21. The liquid-crystalline medium according to claim 1, wherein the rotational viscosity γ1 of said medium is <200 mPa·s.

* * * * *

UNITED STATES PATENT AND TRADEMARK OFFICE
CERTIFICATE OF CORRECTION

PATENT NO. : 8,025,935 B2
APPLICATION NO. : 12/063336
DATED : September 27, 2011
INVENTOR(S) : Melanie Klasen-Memmer et al.

Page 1 of 1

It is certified that error appears in the above-identified patent and that said Letters Patent is hereby corrected as shown below:

Column 56, Line 5, delete formula, insert the following:

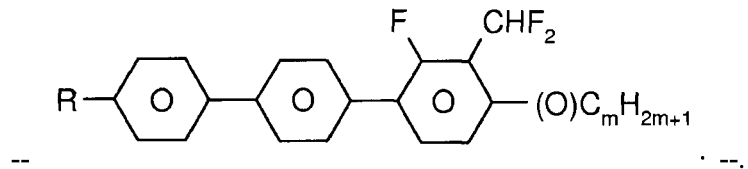

-- . --.

Column 58, Lines 50-59, delete both formulas.

Signed and Sealed this
Sixth Day of March, 2012

David J. Kappos
*Director of the United States Patent and Trademark Office*